(12) United States Patent
Higa

(10) Patent No.: US 8,031,303 B2
(45) Date of Patent: Oct. 4, 2011

(54) LIQUID CYRSTAL DISPLAY DEVICE AND ELECTRONIC APPARATUS INCLUDING DIELECTRIC PROJECTIONS FOR LIQUID CRYSTAL ALIGNMENT

(75) Inventor: Masakatsu Higa, Chino (JP)

(73) Assignee: Seiko Epson Corporation (JP)

( * ) Notice: Subject to any disclaimer, the term of this patent is extended or adjusted under 35 U.S.C. 154(b) by 715 days.

(21) Appl. No.: 11/203,626

(22) Filed: Aug. 12, 2005

(65) Prior Publication Data

US 2006/0050209 A1 Mar. 9, 2006

(30) Foreign Application Priority Data

Sep. 3, 2004 (JP) ................................. 2004-256809

(51) Int. Cl.
*G02F 1/1335* (2006.01)
*G02F 1/1337* (2006.01)

(52) U.S. Cl. ......... 349/114; 349/106; 349/113; 349/123

(58) Field of Classification Search .................. 349/106, 349/113–114, 123
See application file for complete search history.

(56) References Cited

U.S. PATENT DOCUMENTS

| | | | |
|---|---|---|---|
| 6,788,375 B2 | 9/2004 | Ogishima et al. | |
| 7,106,404 B2 | 9/2006 | Okumura et al. | |
| 2002/0036740 A1* | 3/2002 | Kubo et al. | 349/129 |
| 2002/0149728 A1* | 10/2002 | Ogishima et al. | 349/129 |
| 2003/0067570 A1* | 4/2003 | Okamoto et al. | 349/113 |
| 2003/0122998 A1* | 7/2003 | Iijima et al. | 349/106 |
| 2004/0109113 A1 | 6/2004 | Nakano et al. | |
| 2005/0168672 A1* | 8/2005 | Tashiro et al. | 349/114 |

FOREIGN PATENT DOCUMENTS

| | | |
|---|---|---|
| JP | 11-223808 | 8/1999 |
| JP | 11-242226 | 9/1999 |
| JP | 2000-047217 | 2/2000 |
| JP | 2000-267079 | 9/2000 |
| JP | 2003-195296 | 7/2003 |
| JP | 2004-198919 | * 7/2004 |
| KR | 2002-0079583 | 10/2002 |
| KR | 2004-0033263 | 4/2004 |

OTHER PUBLICATIONS

Makoto Jisaki, et al., "Development of transflective LCD for high contrast and wide viewing angle by using homeotropic alignment", Asia Display/IDW '01, pp. 133-136 (2001).

* cited by examiner

*Primary Examiner* — David Nelms
*Assistant Examiner* — Lauren Nguyen
(74) *Attorney, Agent, or Firm* — Harness, Dickey & Pierce, P.L.C.

(57) ABSTRACT

A liquid crystal display device includes a pair of substrate; a liquid crystal layer that is formed between the pair of substrates, and that is composed of liquid crystal having negative dielectric anisotropy, the liquid crystal being vertically aligned in an initial state; dot regions each having a transmissive display region and a reflective display region; a liquid-crystal-layer-thickness adjusting layer that is provided between the liquid crystal layer and at least one of the pair of substrates to make the thickness of the liquid crystal layer in the reflective display region smaller than the thickness of the liquid crystal layer in the transmissive display region; a color filter layer that includes plural types of colored layers having different colors corresponding to the respective dot regions, and that is provided on at least one of the pair of substrates; and alignment regulators that are provided on an inner surface of at least one of the pair of substrates to regulate the alignment of the liquid crystal in the reflective display regions. In the above-mentioned structure, a colored region having the colored layer formed therein and a non-colored region not having the colored layer formed therein are provided in a portion of the colored layer that is arranged in the reflective display region, and the alignment regulators are arranged so as to overlap the non-colored regions of the color filter layer in the reflective display regions in plan view.

13 Claims, 9 Drawing Sheets

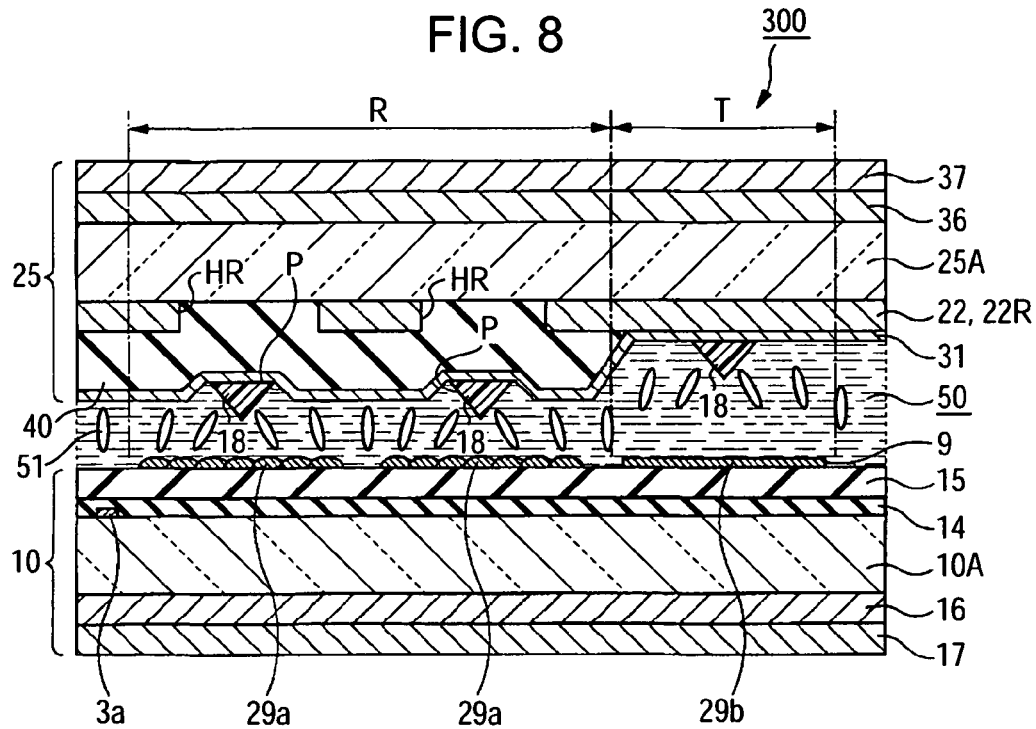
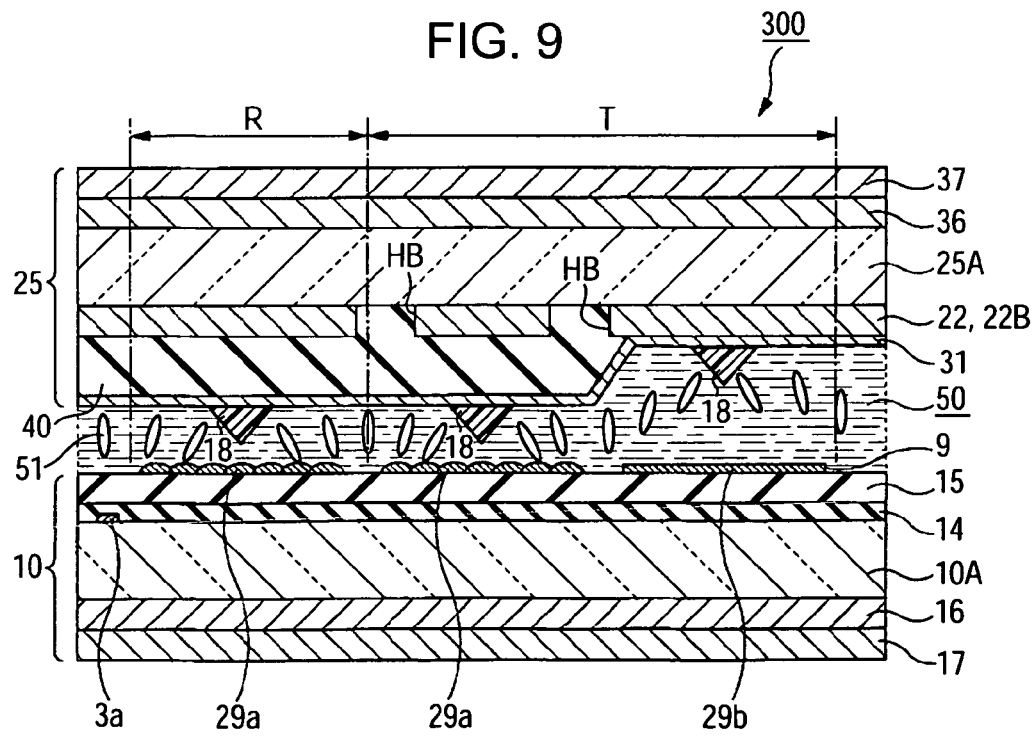

LIQUID CYRSTAL DISPLAY DEVICE AND ELECTRONIC APPARATUS INCLUDING DIELECTRIC PROJECTIONS FOR LIQUID CRYSTAL ALIGNMENT

RELATED APPLICATIONS

This application claims priority to Japanese Patent Application No. 2004-256809 filed Sep. 3, 2004 which is hereby expressly incorporated by reference herein in its entirety.

BACKGROUND OF THE INVENTION

1. Technical Field

The present invention relates to a liquid crystal display device and to an electronic apparatus, and more specifically, to a technique for achieving display having high brightness and a wider viewing angle both in a reflective mode and in a transmissive mode in a transflective color liquid crystal display device using vertical-alignment-type liquid crystal.

2. Related Art

Transflective liquid crystal display devices having both a reflective mode and a transmissive mode have been generally known as liquid crystal display devices. As the transflective liquid crystal display device, a display device has been suggested in which a liquid crystal layer is interposed between an upper substrate and a lower substrate, and a reflective film obtained by forming light-transmissive windows in a metal film made of, for example, Al, is provided on an inner surface of the lower substrate to function as a transflective sheet. In this case, in the reflective mode, external light incident on the upper substrate passes through the liquid crystal layer and is then reflected from the reflective film on the inner surface of the lower substrate. Then, the reflected light passes through the liquid crystal layer again to be emitted from the upper substrate, thereby contributing to display. On the other hand, in the transmissive mode, light emitted from a backlight to the lower substrate passes through the liquid crystal layer via the windows of the reflective film, and is then emitted from the upper substrate to the outside, thereby contributing to display. Therefore, in a region where the reflective film is formed, a portion thereof where the window is formed serves as a transmissive display region, and the other portion serves as a reflective display region.

However, this type of transflective liquid crystal display device has a problem in that a viewing angle is narrow in the transmissive display. The reason is that, since the transflective plate is provided on an inner surface of a liquid crystal cell to prevent the occurrence of parallax, reflective display should be performed by using only one polarizing plate provided on an observer side, which results in a low degree of flexibility in the optical design. Therefore, in order to solve this problem, the inventors, M. Jisaki et al., have proposed a liquid crystal display device using vertical-alignment-type liquid crystal as disclosed in "Development of transflective LCD for high contrast and wide viewing angle by using homeotropic alignment," M. Jisaki et al., Asia Display/ID W'01, pp. 133 to 136 (2001). The liquid crystal display device has the following three features:

(1) A 'VA (vertical alignment) mode' is used in which liquid crystal molecules having negative dielectric anisotropy are vertically aligned with respect to substrates in an initial state, and are then inclined when a voltage is applied;

(2) A 'multi-gap structure' is used in which the thickness (cell gap) of a liquid crystal layer in a transmissive display region is different from that in a reflective display region (for example, see Japanese Unexamined Patent Application Publication No. 11-242226); and (3) An 'alignment dividing structure' is used in which each transmissive display region is formed in the shape of a regular octagon, and a projection is provided at the center of the transmissive display region on a counter substrate to make the liquid crystal molecules incline in all directions in the transmissive display region.

The transflective liquid crystal display device having the multi-gap structure, disclosed in Japanese Unexamined Patent Application Publication No. 11-242226, has an advantage in that electro-optical characteristics (a transmittance-voltage characteristic and a reflectance-voltage characteristic) of the reflective display region are identical to those of the transmissive display region. The reason is that light passes through the liquid crystal layer one time in the transmissive display region, but it passes through the liquid crystal layer two times in the reflective display region.

However, in the paper of Jisaki et al., the directions in which the liquid crystal molecules in the transmissive display region are inclined are controlled by a projection provided at the center of the transmissive display region. However, the paper does not disclose how to control the directions in which the liquid crystal molecules in the reflective display region are inclined at all. When the directions in which the liquid crystal molecules are inclined are not controlled, the liquid crystal molecules are inclined in random directions. In this case, a line of discontinuity, referred to as disclination, appears at boundaries between different liquid crystal alignment regions, which causes residual images. Also, since the alignment regions of the liquid crystal have different viewing angle characteristics, a spotted pattern may appear when the liquid crystal device is viewed from an oblique direction. In addition, it is considered that alignment regulators, such as projections, are provided in the reflective display regions. However, since the reflective display region has a narrower gap than the transmissive display region, alignment disorder of the liquid crystal occurs due to the alignment regulators when the alignment regulators are provided in the narrow gap.

SUMMARY

An advantage of the invention is that it provides a transflective color liquid crystal display device using vertical-alignment-type liquid crystal, capable of reliably regulating directions in which liquid crystal molecules are inclined in a reflective display region and of achieving display having high brightness and a wider viewing angle both in a reflective mode and in a transmissive mode. Another advantage of the invention is that it provides an electronic apparatus including the liquid crystal display device therein, so that the electronic apparatus has a high level of visibility.

According to an aspect of the invention, a liquid crystal display device includes a pair of substrates; a liquid crystal layer that is formed between the pair of substrates, and that is composed of liquid crystal having negative dielectric anisotropy, the liquid crystal being vertically aligned in an initial state; dot regions each having a transmissive display region and a reflective display region; a liquid-crystal-layer-thickness adjusting layer that is provided between the liquid crystal layer and at least one of the pair of substrates to make the thickness of the liquid crystal layer in the reflective display region smaller than the thickness of the liquid crystal layer in the transmissive display region; a color filter layer that includes plural types of colored layers having different colors corresponding to the respective dot regions, and that is provided on at least one of the pair of substrates; and alignment regulators that are provided on an inner surface of at least one of the pair of substrates to regulate the alignment of the liquid crystal in the reflective display regions. In the liquid crystal display device, a colored region having the colored layer formed therein and a non-colored region not having the colored layer formed therein are provided in a portion of the colored layer that is arranged in the reflective display region, and the alignment regulators are arranged so as to overlap the non-colored regions of the color filter layer in the reflective display regions in plan view. In the liquid crystal display device of the invention, it is preferable that electrodes for driving the liquid crystal be provided on inner surfaces of the pair of substrates, respectively, and that each alignment regulator be composed of an electrode slit (for example, a slit-shaped opening) formed by cutting out a portion of the electrode or a dielectric projection provided on the electrode.

The liquid crystal display device of the invention has a structure for properly controlling the alignment direction of liquid crystal molecules by incorporating liquid crystal of a vertical alignment mode into a transflective liquid crystal display device and by additionally providing a liquid-crystal-layer-thickness adjusting layer for making retardation in the reflective display region substantially equal to that in the transmissive display region (that is, by additionally providing a multi-gap structure). Further, the liquid crystal display device of the invention includes the color filter layer having a plurality of colored layers corresponding to the respective dot regions, which enables a color display. In the transflective color liquid crystal display device of the invention, light passes through the colored layer one time in the reflective mode, and it passes through the colored layer the two times in the transmissive mode to perform color display. In this case, when a light coloring material is used for the colored layer, regarding display in the reflective mode as important, it is difficult to obtain high-contrast display in the transmissive mode. On the contrary, when a deep coloring material is used for the colored layer, regarding display in the transmissive mode as important, reflected light has a deep color, which results in dark display. In order to solve these problems, the following two structures have been suggested: a structure in which different coloring materials are used for the reflective display region and the transmissive display region, respectively; and a structure in which non-colored regions (for example, openings) are formed in the colored layer of the reflective display region to perform color adjustment in reflective display. The liquid crystal display device of the invention adopts the latter structure.

In the invention, since alignment regulators, such as projections, are arranged in non-colored regions of the colored layer, it is possible to increase the thickness of the liquid crystal layer in a portion where the alignment regulator is formed by the thickness of the colored layer in practice. That is, in a case in which projections are arranged in a region where the colored layer is formed, when the projections are formed in the reflective display region and the transmissive display region by the same process, and when the projections are formed with a height suitable for the transmissive display region, the height of the projection is excessively large in the reflective display region, which causes the leakage of light to occur in the vicinity of the projection, resulting in a reduction in contrast. On the other hand, when the projections are formed with a height suitable for the reflective display region, the height of the projection is excessively small in the transmissive display region, so that it is difficult to perform sufficient alignment control, which causes a spotted pattern to be generated due to disclination. On the contrary, when the projections are arranged in the non-colored region of the colored layer so as to be buried in the colored layer, the height of the projection is decreased by a height corresponding to the buried portion, so that a gap from the top of the projection to a surface of the counter substrate is increased in practice. Therefore, good alignment control can be performed in the reflective display region where the gap is relatively narrow, as in the transmissive display region.

In the above-mentioned structure, it is preferable that one of the plural types of colored layers having a specific color be arranged such that the colored region thereof overlaps the alignment regulators in plan view, and that the colored layers having the other colors be arranged such that the non-colored regions thereof overlap the alignment regulators in plan view.

It has been known that a slight shift in color from white to yellow occurs in the color liquid crystal display device of a vertical alignment mode when a high voltage is applied, and the shift in color is a problem to be solved. This is caused by so-called chromatic dispersion in which a variation in the retardation of the liquid crystal layer is different for every color when a voltage is applied. It is possible to reduce the variation in color to some extent by adjusting the spectrum of light emitted from, for example, a backlight, in transmissive display. However, since external light difficult to control is used in reflective display, the shift in color from white to yellow comes into a serious problem. Meanwhile, in a case in which the projections are used for controlling the directions in which the liquid crystal molecules are inclined, when a voltage is applied, the distribution of an electric field occurs in the plane in a place where the projection is present and in a place where the projection is absent, which causes the distribution of brightness to occur in the plane. When a low voltage is applied, the region where the projection is formed does not transmit light. However, when a high voltage is applied, the region where the projection is formed also contributes to bright display. The invention improves color reproducibility in the reflective mode by changing the relative position between the projection and the colored region in the reflective display region for every color, using the fact that the region where the projection is formed contributes to bright display when a high voltage is applied. In the invention, the colored region is arranged so as to overlap, in plan view, the projection in a dot region having a color (for example, blue) whose shade is light when a low voltage is applied or whose shade is deep when a high voltage is applied. In addition, the projections of dot regions having the other colors (for example, red and green) are arranged at positions corresponding to the non-colored regions so as not to overlap the colored regions in plan view. In this structure, when a low voltage is applied, the liquid crystal molecules positioned around the projections hardly contribute to bright display. Therefore, the loss of light corresponding to the area of the projection occurs in the colored region arranged to overlap the projection, which results in dark display (light-colored display). Meanwhile, when a high voltage is applied, the liquid crystal molecules positioned around the projections also contribute to bright display. Therefore, the loss of light is reduced, resulting in bright display (deep-colored display). As such, according to the structure of the invention, a deep color tones down when a low voltage is applied, and a light color is enhanced when a high voltage is applied, which makes it possible to achieve display having a high degree of color reproducibility, regardless of an applied voltage.

In the above-mentioned structure, it is preferable that an area ratio of the colored region to the non-colored region in the colored layer be set to be most suitable for every color in consideration of a color balance of each color.

According to this structure, it is possible to achieve display having a high degree of color reproducibility in the reflective display using external light difficult to control by determining the area ratio according to spectral characteristics of external light. In addition, it is possible to achieve transmissive display having a high degree of color reproducibility by determining the area ratio in consideration of spectral characteristics of light emitted from, for example, a backlight.

In the above-mentioned structure, it is preferable that an area ratio of the reflective display region to the transmissive display region in each dot region be set to be most suitable for every color in consideration of a color balance of each color.

According to this structure, it is possible to achieve display having a high degree of color reproducibility in the reflective display using external light difficult to control by determining the area ratio according to spectral characteristics of external light. In addition, it is possible to achieve transmissive display having a high degree of color reproducibility by determining the area ratio in consideration of spectral characteristics of light emitted from, for example, a backlight.

In the above-mentioned structure, it is preferable that electrodes for driving the liquid crystal be provided on inner surfaces of the pair of substrates, respectively, and that each of the electrodes provided on one of the pair of substrates include a plurality of island-shaped portions and connecting portions for electrically connecting the plurality of island-shaped portions in the reflective display region of one dot region.

In the invention, a dot region, serving as a display unit, is divided into a plurality of sub-dot regions, and the sub-dot regions are connected to each other, so that directions in which liquid crystal molecules are inclined are controlled in the unit of the sub-pixel region. According to this structure, when a voltage is applied, the liquid crystal molecules are radially inclined with respect to the center of the sub-dot region by an oblique electric filed generating at the edge of an electrode portion (island-shaped portion) formed in an island shape. Thus, it is possible to achieve high-contrast display at a wide viewing angle in all directions (360°).

In the above-mentioned structure, it is preferable that one of the plural types of colored layers having a specific color be arranged such that the colored region thereof overlaps a region between adjacent island-shaped portions in plan view in the reflective display region, and that the colored layers having the other colors be arranged such that the colored regions thereof do not overlap the region between the island-shaped portions in plan view.

It is possible to regard a region between adjacent island-shaped portions (a region between the island-shaped portions) as a kind of electrode slit formed by cutting out a portion of the electrode. Therefore, the region between adjacent island-shaped portions functions to regulate the alignment of liquid crystal, similar to the electrode slit (for example, slit-shaped opening) used as the alignment regulator. The invention improves color reproducibility by changing the arrangement relationship between the colored region of the colored layer and the region between the island-shaped portions, serving as the alignment regulator, for every color. In the invention, the region between the island-shaped portions is arranged so as to overlap, in plan view, a portion of the colored region having a color (for example, blue) whose shade is light when a low voltage is applied or whose shade is deep when a high voltage is applied. In addition, the colored regions having the other colors (for example, red and green) are arranged so as not to overlap the region between the island-shaped portions in plan view (that is, the colored region is not provided in a portion corresponding to the region between the island-shaped portions. In other wards, the region between the island-shaped portions serves as a non-colored region). In this structure, when a low voltage is applied, the liquid crystal molecules positioned in the region between the island-shaped portions hardly contribute to bright display. Therefore, the loss of light corresponding to the area of the projection occurs in the colored region arranged to overlap the region between the island-shaped portions, which results in dark display (light-colored display). Meanwhile, when a high voltage is applied, the liquid crystal molecules positioned in the region between the island-shaped portions also contribute to bright display. Therefore, the loss of light is reduced, resulting in bright display (deep-colored display). As such, according to the structure of the invention, a deep color tones down when a low voltage is applied, and a light color is enhanced when a high voltage is applied, which makes it possible to achieve display having a high degree of color reproducibility, regardless of an applied voltage.

According to another aspect of the invention, an electronic apparatus includes the above-mentioned liquid crystal display device.

Therefore, it is possible to provide an electronic apparatus including a display unit having a high degree of visibility, capable of achieving display having high brightness and a wider viewing angle both in a reflective mode and in a transmissive mode.

BRIEF DESCRIPTION OF THE DRAWINGS

The invention will be described with reference to the accompanying drawings, wherein like numbers reference like elements, and wherein:

FIG. 8 is a cross-sectional view taken along the line VIII-VIII of FIG. 7;

FIG. 9 is a cross-sectional view taken along the line IX-IX of FIG. 7;

DESCRIPTION OF THE EMBODIMENTS

Hereinafter, preferred embodiments of the invention will be described with reference to the accompanying drawings.

In each drawing, a scale of each layer or member is adjusted in order to have a recognizable size.

First Embodiment

Liquid Crystal Display Device

Figure 1:
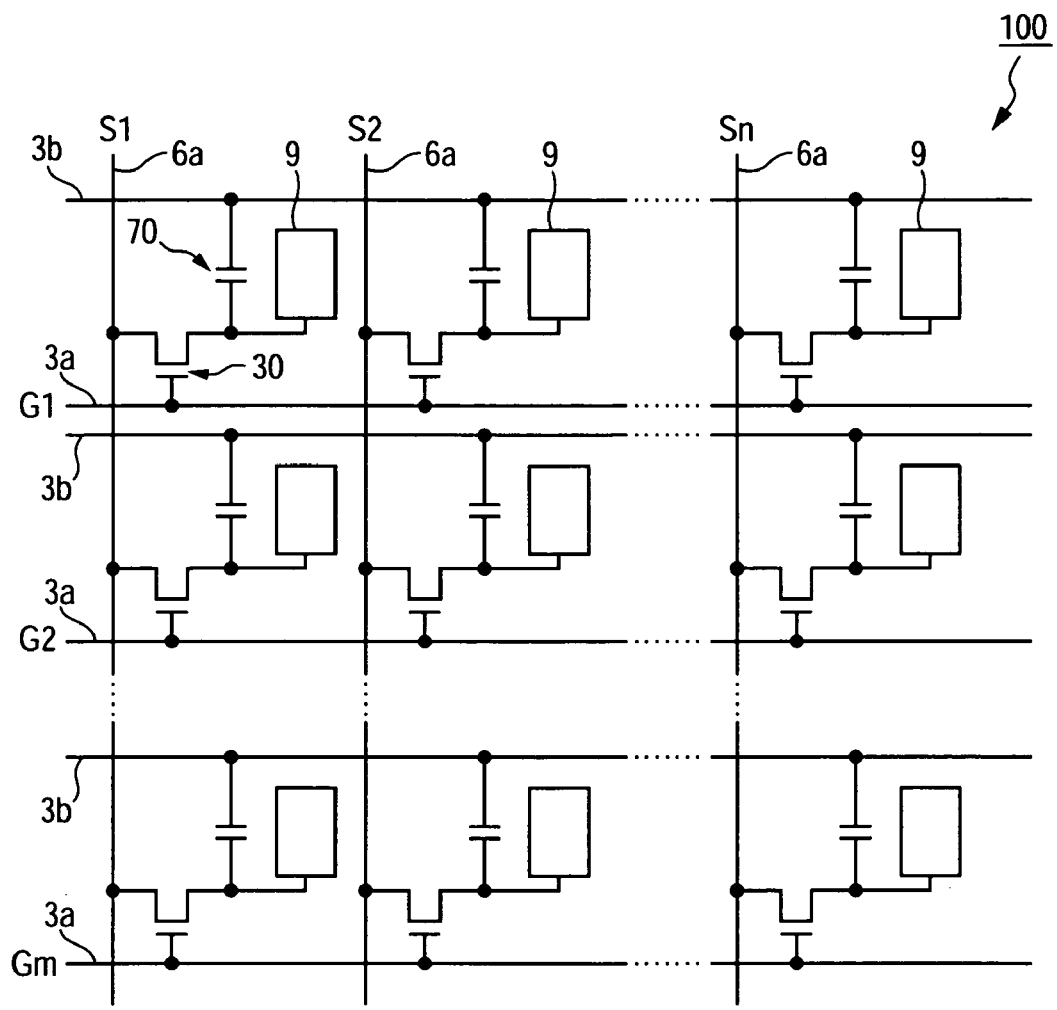
FIG. 1 is a circuit diagram of a liquid crystal display device according to a first embodiment of the invention.
Figure 2A:
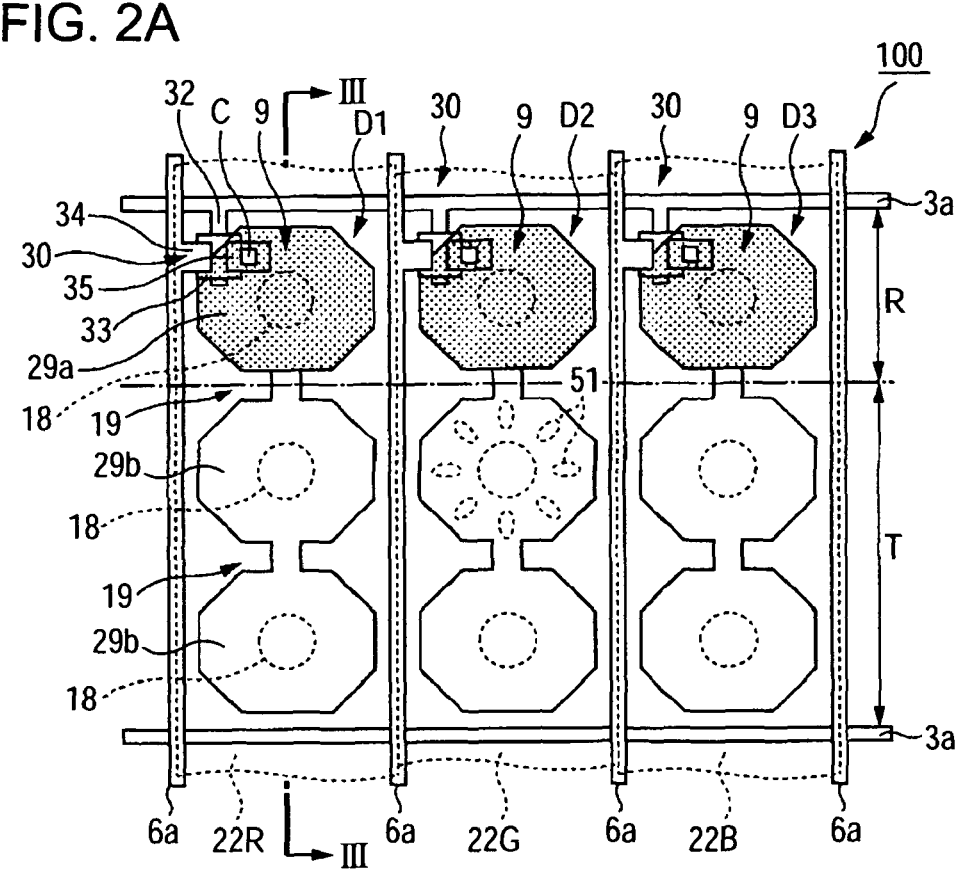
FIGS. 2A and 2B are plan views illustrating the structure of one pixel region of the liquid crystal display device.
Figure 2B:
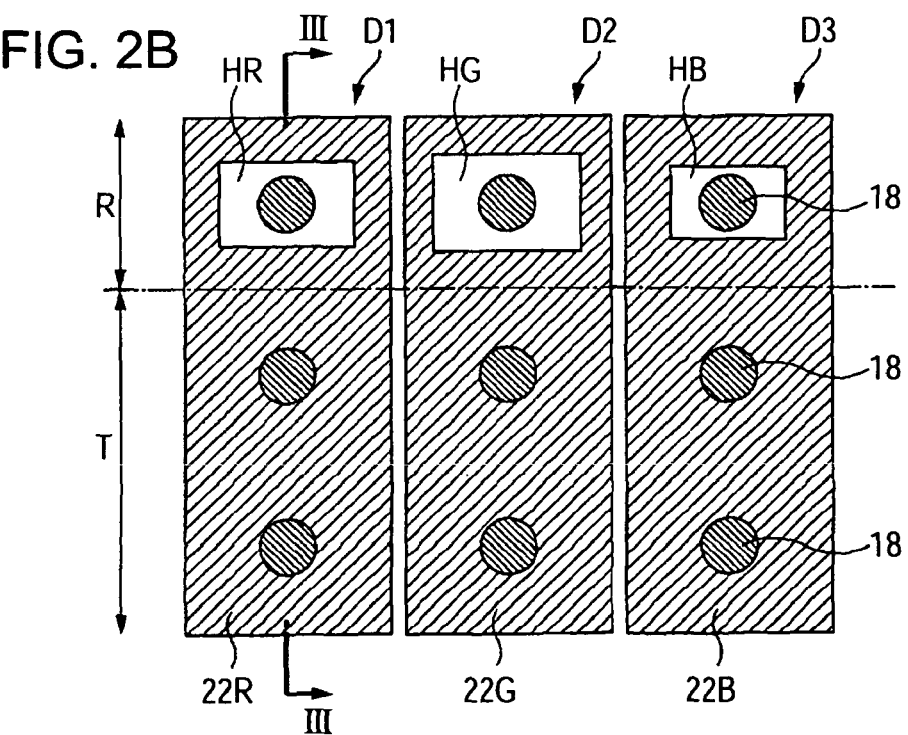
Figure 3:
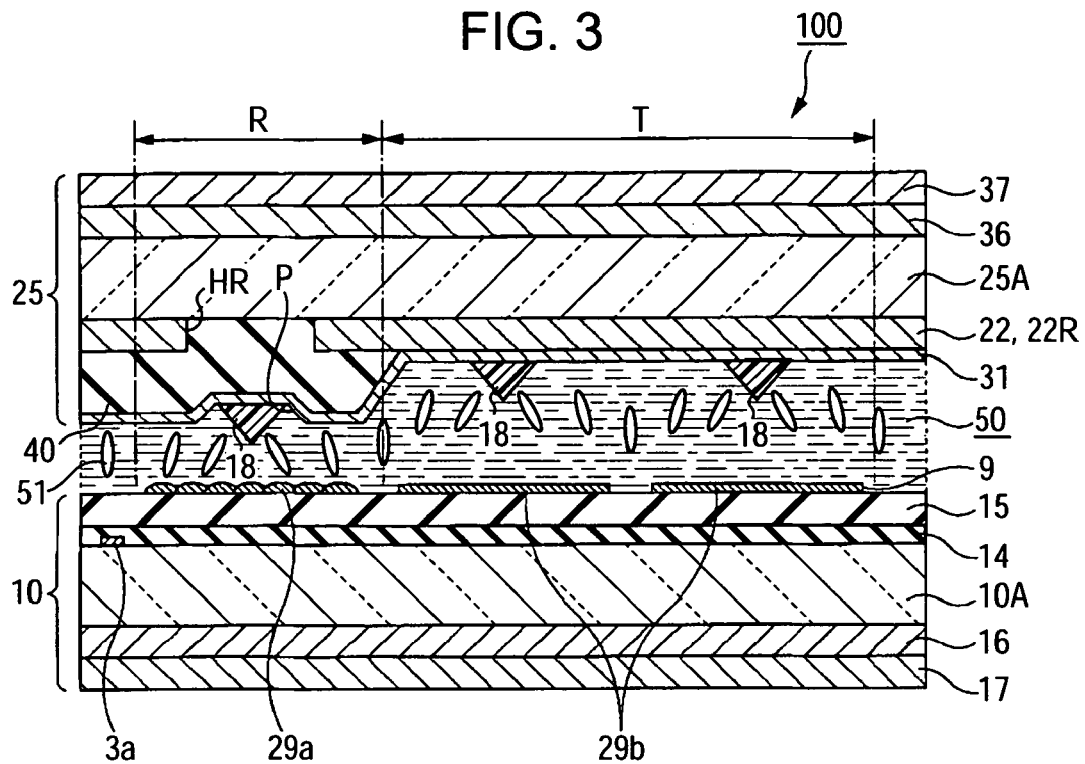
FIG. 3 is a cross-sectional view taken along the line of FIG. 2.

FIG. 1 is an equivalent circuit diagram of a plurality of dots arranged in a matrix that constitute an image display region of a liquid crystal display device 100 according to a first embodiment of the invention, and FIGS. 2A and 2B are plan views illustrating the structure of a pixel region of the liquid crystal display device 100 of the first embodiment. Specifically, FIG. 2A is a plan view of the pixel region, as viewed from an element substrate side, and FIG. 2B is a plan view of the pixel region, as viewed from a counter substrate side. FIG. 3 is a cross-sectional view illustrating the structure of the liquid crystal display device 100, taken along the line of FIGS. 2A and 2B.

The liquid crystal display device 100 of this embodiment is an active-matrix transmissive liquid crystal device that uses thin film transistors (TFTs) as switching elements. In the liquid crystal display device 100 of this embodiment, as shown in FIG. 1, each of the plurality of dots arranged in a matrix that constitute the image display region includes a pixel electrode 9 and a TFT 30, serving as a switching element to control the pixel electrode 9. A data line 6a (electrode line) to which image signals are supplied is electrically connected to a source of the TFT 30. Image signals S1, S2, Sn to be written on the data line 6a are line-sequentially supplied in this order, or they are supplied to adjacent data lines 6a constituting each group. In addition, a scanning line (electrode line) 3a is electrically connected to a gate of the TFT 30. Scanning signals G1, G2, . . . , Gm are line-sequentially applied to a plurality of the scanning lines 3a with pulses at a predetermined timing. The pixel electrode 9 is electrically connected to a drain of the TFT element 30, and the TFT 30, serving as a switching element, is maintained in an on state for a predetermined period of time to cause the image signals S1, S2, . . . , Sn supplied from the data line 6a to be written at a predetermined timing.

The image signals S1, S2, . . . , Sn with predetermined levels, which are written onto liquid crystal through the pixel electrodes 9, are held between the pixel electrodes and a common electrode, which will be described later, for a predetermined period of time. The alignment and order of liquid crystal molecules are changed depending on the level of the applied voltage, which causes light to be modulated, thereby performing gray-scale display. In order to prevent the leakage of the held image signals, a storage capacitor 70 is additionally provided parallel to a liquid crystal capacitor that is formed between the pixel electrode 9 and the common electrode. Reference numeral 3b denotes a capacitor line.

Next, the structure of each pixel of the liquid crystal display device 100 according to this embodiment will be described with reference to FIGS. 2A and 2B. As shown in FIG. 2A, in the liquid crystal display device 100 according to this embodiment, rectangular regions in plan view that are surrounded by the scanning lines 3a extending parallel to each other and the data lines 6a extending orthogonal to the scanning lines 3a serve as dot regions D1 to D3, and a color filter (colored layer) having any one of the three primary colors is formed corresponding to one dot region, so that three color filters 22R, 22G, and 22B corresponding to the three dot regions D1 to D3 constitute one pixel region. In addition, these color filters 22R, 22G, and 22B are formed in strip shapes extending in the vertical direction of FIG. 2A so as to be laid across the plurality of dot regions in the extending direction, respectively, and are periodically arranged in the horizontal direction of FIG. 2A.

Each of the pixel electrodes 9 provided in the dot regions D1 to D3 is divided into a plurality (in this embodiment, three) of sub-pixels (island-shaped portions) 29a and 29b by slits 19 provided in the respective dot regions, and the sub-pixels are connected to each other at the central portions (by connecting portions). The sub-pixel 29a located at the upper side of FIG. 2A is composed of a reflective metal film made of, for example, Al (aluminum) or Ag (silver), or a laminated structure including such a mital film and a conductive film made of a transparent material, such as ITO (indium tin oxide). This sub-pixel 29a functions as a reflective electrode, and a region in which the sub-pixel 29a is formed serves as a reflective display region R. The reflective electrode has unevenness on a surface thereof, and the unevenness causes reflected light to be scattered, which makes it possible to perform display with a high degree of visibility. In addition, two sub-pixels 29b located at the lower side of FIG. 2A are composed of conductive films made of a transparent material, such as ITO (indium tin oxide), and a region in which the sub-pixels 29b are formed serves as a transmissive display region T. That is, the liquid crystal display device 100 of this embodiment is a transflective liquid crystal display device in which one dot region includes the reflective display region R for performing reflective display and the transmissive display region T for performing transmissive display and in which one third of a display region contributes to reflective display and two thirds thereof contributes to transmissive display. In FIGS. 2A and 2B, boundaries between the reflective display regions R and the transmissive display regions T are represented by a one-dot chain line. Further, the connecting portions between the sub-pixels are composed of conductive films made of a transparent material, such as ITO, and also contribute to the transmissive display. Dielectric projections 18, which are alignment regulators for regulating the alignment of liquid crystal, are provided at the centers of the sub-pixels 29a and 29b, respectively. In addition, the respective sub-pixels 29a and 29b are chamfered to have substantially octagonal or circular shapes in plan view.

The TFT 30 is provided among the scanning line 3a, the data line 6a, and the sub-pixel 29a located at the upper side of FIG. 2A. The TFT 30 includes a semiconductor layer 33, a gate electrode portion 32 provided below the semiconductor layer 33 (on the side of a substrate body 10A), a source electrode portion 34 provided above the semiconductor layer 33, and a drain electrode portion 35. A channel region of the TFT 30 is formed in a region opposite to the gate electrode portion 32 of the semiconductor layer 33, and source and drain regions are formed at both sides of the channel region on the semiconductor layer.

The gate electrode portion 32 is formed by branching a portion of the scanning line 3a in the extending direction of the data line 6a, and is opposite to the semiconductor layer 33 at its leading end, with an insulating film (not shown) interposed therebetween. The source electrode portion 34 is formed by branching a portion of the data line 6a in the extending direction of the scanning line 3a, and is electrically connected to the source region of the semiconductor layer 33 through a contact hole (not shown). One end of a drain electrode 35 is electrically connected to the drain region through a contact hole (not shown), and the other end of the drain electrode 35 is electrically connected to the sub-pixel 29a (the pixel electrode 9) directly or through a contact hole C.

Further, the TFT 30 is maintained in an on state for a predetermined period of time by gate signals input through the scanning line 3a, so that the image signals supplied through the data line 6a are written onto the liquid crystal at a predetermined timing.

Meanwhile, in the plan-view structure shown in FIG. 3, the liquid crystal display device 100 includes an element substrate 10 and a counter substrate 25 provided opposite thereto, and a liquid crystal layer 50 composed of liquid crystal that has negative dielectric anisotropy (where a refractive index anisotropy Δn is, for example, 0.1) and that is vertically aligned in an initial alignment state is interposed between the substrates 10 and 25. The liquid crystal layer 50 is formed substantially with a uniform thickness in a region in which the pixel electrodes 9 are formed, as shown in FIG. 3. A backlight (not shown) having a light source, serving as an illuminating unit, a reflector, an optical waveguide, etc., is provided on an outer side of a liquid crystal cell opposite to an outer surface of the element substrate 10. A substantially bar-shaped ellipsoid denoted by reference numeral 51 conceptually represents a liquid crystal molecule that is vertically aligned.

The element substrate 10 includes, as a base substrate, the substrate body 10A made of a transparent material, such as quartz or glass. The scanning lines 3a are formed on an inner surface (a surface facing the liquid crystal layer) of the substrate body 10A. A gate insulating film 14 is formed so as to cover the scanning lines 3a, and the data lines 6a, etc., are formed on the gate insulating film 14 (see FIG. 2A). In addition, an interlayer insulating film 15 is formed so as to cover the data lines 6a, etc. Then, the pixel electrodes 9 are formed thereon. Although not shown, a vertical alignment film made of, for example, polyimide is formed to cover the pixel electrodes 9 and the interlayer insulating film 15, so that the liquid crystal molecules 51 are vertically aligned with respect to the substrate in an initial state. A retardation plate 16 and a polarizing plate 17 are provided on the outer surface of the substrate body 10A.

The counter substrate 25 includes, as a base substrate, a substrate body 25A made of a transparent material, such as quartz or glass. Color filters 22 (color filter layers) are formed on an inner surface of the substrate body 25A so as to be laid across the reflective display regions R and the transmissive display regions T. The color filters 22 are composed of plural types of color filters (colored layers) 22R, 22G, and 22B having different colors, and a light-shielding layer (black matrix) made of a black resin is formed among the respective color filters 22R, 22G, and 22B constituting the color filters 22, if necessary. As shown in FIG. 2B, rectangular non-colored opening regions (non-colored regions) HR, HG, and HB are formed in the color filters 22R, 22G, and 22B at positions corresponding to the centers of the sub-pixels 29a for reflective display, respectively. The area ratio of the colored region having a coloring material arranged therein to the non-colored region not having a coloring material arranged therein (the colored area/the non-colored area) is set to be most suitable for the respective colors of R, G, and B in consideration of the color balance of each color. For example, in this embodiment, the green color filter 22G (that is, the non-colored region HG) having a high degree of luminosity has the largest area of the non-colored region, followed by the red color filter 22R and the blue color filter 22B in this order. Accordingly, the blue color filter 22B has the highest area ratio, followed by the red color filter 22R and the green color filter 22G in this order.

The insulating film 40 is selectively formed on the inner surface of the color filter 22, corresponding to the reflective display region R. Since the insulating film 40 is partially formed in the dot regions, the thicknesses of the liquid crystal layer 50 are different from each other in the reflective display region R and the transmissive display region T. The insulating film 40 is composed of a film made of an organic material, such as acrylic resin. The insulating film 40 is formed with a thickness of about 2 μm±1 μm, and the thickness of the liquid crystal layer 50 in a region where the insulating film 40 is not provided is about 2 to 6 μm. The thickness of the liquid crystal layer 50 in the reflective display region R is half that of the liquid crystal layer 50 in the transmissive display region T. That is, the insulating film 40 functions as a liquid-crystal-layer-thickness adjusting layer to cause the thicknesses of the liquid crystal layer 50 to be different from each other in the reflective display region R and the transmissive display region T, thereby realizing a multi-gap structure. In this way, the liquid crystal display device 100 of this embodiment can achieve high-contrast, bright display. In addition, an inclined surface in which the thickness of the insulating film 40 is continuously varied is formed around the boundary between the reflective display region R and the transmissive display region T. In addition, the inclined surface substantially overlaps an edge portion of the reflective electrode 29a at the center of the dot region in plan view, and also overlaps a linear electrode film (connecting portion) for connecting adjacent sub-pixels.

A concave portion P is formed in the surface of the insulating film 40 in the non-colored region of the color filter 22, corresponding to the unevenness of the color filter 22. A step difference between the colored region and the non-colored region in the reflective display region R is not completely removed, but is reduced to some extent by the insulating film 40 formed on the color filter 22. For example, when the insulating film 40 is formed with the above-mentioned thickness, a step difference of about 0.05 to 0.5 μm occurs. This step difference is the concave portion P. The concave portion P has a sufficiently small step difference not to have a great influence on the alignment of liquid crystal molecules, but a portion where the concave portion P is formed has a gap greater than that in the vicinity thereof.

Further, a counter electrode 31 is formed on the inner surface of the substrate body 25A so as to cover the color filter 22 and the insulating film 40. The counter electrode 31 is a conductive film made of a transparent material, such as ITO, and the dielectric projections 18 protruding toward the liquid crystal layer 50 are provided on the counter electrode 31 at positions facing the pixel electrodes 9. Although the dielectric projection 18 is shown to have substantially a triangular shape in sectional view in the drawings, it is practically formed in a hemispherical shape. The dielectric projections 18 are formed corresponding to the centers of the two sub-pixels 29b in the transmissive display region T, respectively, and one dielectric projection 18 is formed corresponding to the center of the sub-pixel 29a in the reflective display region R. The dielectric projection 18 of the reflective display region R is arranged in the concave portion P formed in the insulating film 40. These dielectric projections 18 are made of a dielectric material, such as resin, and can be formed by a photolithography technique using a mask. In this embodiment, the dielectric projections 18 are collectively formed with a height of 1.2 μm and a diameter of 12 μm in the reflective display region R and the transmissive display region T using a positive resist made of a novolac-based material. After the resist is developed, post-baking is performed at a temperature of 220° C., thereby obtaining hemispherical projections. Each dielectric projection 18 is formed with a height most suitable for transmissive display, and is formed with a relatively large height in the reflective display region R. Since the dielectric projection 18 of the reflective display region R is arranged in the concave portion P in this embodiment, the height of the dielectric projection 18 formed in the concave portion is actually smaller than that of the dielectric projection formed on a flat surface (that is, formed on a flat surface without the concave portion P).

Although not shown, a vertical alignment film made of, for example, polyimide is formed so as to cover the counter electrode 31 and the dielectric projections 18 to cause the liquid crystal molecules 51 to be vertically aligned with respect to the substrates in their initial states.

A retardation plate 36 and a polarizing plate 37 are formed on the outer surface of the substrate body 25A in this order. The polarizing plates 17 and 37 transmit only linearly polarized light oscillating in a specific direction. In addition, quarter-wave plates for delaying the wavelength of visible rays by about a quarter of a wavelength are used as the retardation plates 16 and 36. The transmission axes of the polarizing plates 17 and 37 are arranged at an angle of about 45° with respect to the slow axes of the retardation plates 16 and 36, and thus the polarizing plates 17 and 37 and the retardation plates 16 and 36 function as a circularly polarizing plate. This circularly polarizing plate can convert linearly polarized light into circularly polarized light, or vice versa. In addition, the polarizing plates 17 and 37 are arranged such that the transmission axes thereof are orthogonal to each other, and the retardation plates 16 and 36 are also arranged such that the slow axes thereof are orthogonal to each other. The circularly polarizing plate is generally formed by a combination of a polarizing plate and a quarter-wave plate. However, the circularly polarizing plate (broadband circularly polarizing plate) may be formed by a combination of a polarizing plate, a half-wave plate, and a quarter-wave plate, which makes it possible to perform black display with an achromatic color.

Display Operation

Next, a display operation of the liquid crystal display device 100 of this embodiment will be described.

First, in a transmissive mode, light emitted from a backlight is converted into circularly polarized light by the polarizing plate 17 and the retardation plate 16, and is then incident on the liquid crystal layer 50. Since the liquid crystal molecules vertically aligned with respect to the substrates when no voltage is applied have no refractive index anisotropy, the incident light travels through the liquid crystal layer 50 in the circularly-polarized state. The incident light having passed through the retardation plate 16 is converted into linearly polarized light whose transmission axis is orthogonal to the transmission axis of the polarizing plate 37. Since the linearly polarized light does not pass through the polarizing plate 37, black display is performed in the liquid crystal display device 100 of this embodiment when no voltage is applied (normally black mode).

Meanwhile, when a voltage is applied to the liquid crystal layer 50, the liquid crystal molecules are aligned so as to be inclined with respect to the substrates, so that they have refractive index anisotropy with respect to transmission light. Therefore, the circularly polarized light incident on the liquid crystal layer 50 from the backlight is converted into elliptically polarized light while passing through the liquid crystal layer 50. Although the incident light passes through the retardation plate 36, some or all of the incident light components pass through the polarizing plate 37 without being converted into linearly polarized light whose transmission axis is orthogonal to the transmission axis of the polarizing plate 37. Therefore, in the liquid crystal display device 100 of this embodiment, white display is performed when a voltage is applied. Thus, it is possible to perform gray-scale display by adjusting the voltage applied to the liquid crystal layer 50 in the above-mentioned structure. In this case, in this embodiment, since the dielectric projections 18 are arranged corresponding to the centers of the sub-pixels 29b, respectively, the liquid crystal molecules 51 are vertically aligned with respect to outlines of the sub-pixels 29b. In addition, the liquid crystal molecules 51 are vertically aligned with respect to the inclined surfaces of the dielectric projections 18 in the vicinities of the dielectric projections when no voltage is applied. On the other hand, when a voltage is applied, as shown in FIG. 3, the liquid crystal molecules 51 are inclined from the dielectric projections 18 to the outer sides thereof. That is, the liquid crystal molecules 51 are aligned in the radial direction of each dielectric projection 18 in plan view (see FIG. 2A). Therefore, the liquid crystal display device 100 of this embodiment can display an image at a wider viewing angle by allowing directors of the liquid crystal molecules 51 to be aligned in all directions when a voltage is applied. In addition, since the color filter 22 is arranged in the entire transmissive display region T, all light components passing through the sub-pixels 29b are colored.

Further, in a reflective mode, light incident from the outer side of the counter electrode 25 is converted into circularly polarized light while passing through the polarizing plate 37 and the retardation plate 36, and is then incident on the liquid crystal layer 50. Since the liquid crystal molecules vertically aligned with respect to the substrates when no voltage is applied have no refractive index anisotropy, the circularly-polarized light travels through the liquid crystal layer 50 to the sub-pixel 29a (reflective electrode). Then, the light is reflected from the sub-pixel 29a to return to the liquid crystal layer 50, and is then incident on the retardation plate 36 again. In this case, since the rotation direction of the circularly polarized light reflected from the sub-pixel 29a is reversed, the light is converted into linearly polarized light whose transmission axis is orthogonal to the transmission axis of the polarizing plate 37 by the retardation plate 36. In addition, since the linearly polarized light does not pass through the polarizing plate 37, black display is performed in the liquid crystal display device 100 of this embodiment when no voltage is applied (normally black mode).

Meanwhile, when a voltage is applied to the liquid crystal layer 50, the liquid crystal molecules are aligned so as to be inclined with respect to the substrates, so that they have refractive index anisotropy with respect to transmission light. Therefore, the circularly polarized light incident on the liquid crystal layer 50 from the outer side of the counter substrate 25 is converted into linearly polarized light while passing through the liquid crystal layer 50, and then reaches the sub-pixel 29a (reflective electrode). Then, the light is reflected from the sub-pixel 29a, and then passes through the liquid crystal layer 50 to be incident on the retardation plate 36 again. Since the reflected light is circularly polarized light having the same rotation direction as the previously incident light, it is converted into linearly polarized light whose transmission axis is parallel to the transmission axis of the polarizing plate 37 by the retardation plate 36, and then passes through the polarizing plate 37. Therefore, in the liquid crystal display device 100 of this embodiment, white display is performed when a voltage is applied. In addition, it is possible to perform gray-scale display by adjusting the voltage applied to the liquid crystal layer 50 in the above-mentioned structure. In this case, in this embodiment, since the dielectric projections 18 are arranged corresponding to the centers of the sub-pixels 29a, respectively, the liquid crystal molecules 51 are vertically aligned with respect to the outlines of the sub-pixels 29a. In addition, the liquid crystal molecules 51 are vertically aligned with respect to the inclined surfaces of the dielectric projections 18 in the vicinities of the dielectric projections when no voltage is applied. On the other hand, when a voltage is applied, as shown in FIG. 3, the liquid crystal molecules 51 are inclined from the dielectric projections 18 to the outer sides thereof. That is, the liquid crystal molecules 51 are aligned in the radial direction of each dielectric projection 18 in plan view (see FIG. 2A). Therefore, the liquid crystal display device 100 of this embodiment can display an image at a wider viewing angle by allowing directors of the liquid crystal molecules 51 to be aligned in all directions when a voltage is applied. In addition, external light passes through the color filters 22 two times when it is incident and exits. However, since the non-colored regions HR, HG, and HB are formed in the color filters 22, colored light is not made dark. That is, since the non-colored regions HR, HG, and HB are provided in a portion of a region overlapping the sub-pixel 29a in plan view, a mixture of non-colored light passing through the non-colored regions and colored light passing through the colored regions is obtained in the reflective mode. Therefore, the color of the colored light tones down by the non-colored light, so that light having the same color as that in the transmissive mode is emitted.

Figure 4A:
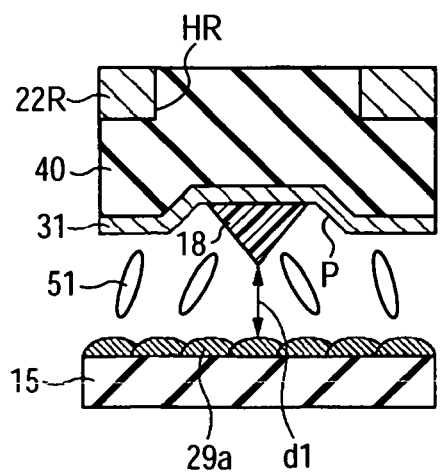
FIGS. 4A and 4B are cross-sectional views illustrating the operation of the invention.
Figure 4B:
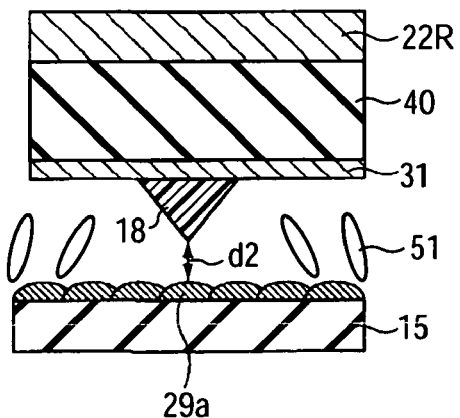

Further, in this embodiment, since the dielectric projection 18 of the reflective display region R is arranged in the concave portion P formed by the non-colored regions HR, HG, and HB, the thickness of the liquid crystal layer on the upper side of the dielectric projection 18 is maintained to be large, compared to a case in which the dielectric projection is provided on a flat surface not having the concave portion P. FIGS. 4A and 4B are cross-sectional views schematically illustrating the vicinity of a projection in the reflective display region R. Specifically, FIG. 4A is a cross-sectional view illustrating a structure in which the dielectric projection 18 is arranged in the concave portion P as in this embodiment, and FIG. 4B is a cross-sectional view illustrating a structure in which the dielectric projection 18 is provided on a flat surface of a substrate not having the concave portion P. As shown in FIG. 4B, when the dielectric projection 18 is provided on the flat surface, the height of the dielectric projection 18 causes a reduction in gap between substrates, that is, a reduction in the thickness of the liquid crystal layer contributing to retardation. In particular, in a multi-gap structure, since the insulating film (liquid-crystal-layer-thickness adjusting layer) 40 for adjusting the thickness of the liquid crystal layer is provided in the reflective display region R, the reflective display region R is more greatly affected by the reduction in gap than the transmissive display region T. As such, when the dielectric projection 18 having a height suitable for transmissive display is formed in the reflective display region R having the narrow gap, the liquid crystal molecules located at the top of the dielectric projection 18 hardly contribute to retardation at a low voltage. As a result, the area of a region contributing to display in practice is reduced by an area corresponding to the projection. On the contrary, as shown in FIG. 4A, when the dielectric projection 18 is provided in the concave portion P, the height of the dielectric projection 18 is reduced by the depth of the concave portion P, so that the thickness of the liquid crystal layer is maintained to be larger around the projection. As a result, in this case, the liquid crystal molecules around the projections sufficiently contribute to retardation, so that the area of the region contributing to display in practice becomes larger that that shown in FIG. 4B.

As described above, since the liquid crystal display device 100 of this embodiment adopts the multi-gap structure in which the insulating film 40 for adjusting the thickness of the liquid crystal layer is partially provided in the dot regions, it is possible to make coincide the retardation of the liquid crystal layer 50 in the transmissive display region T with that in the reflective display region R, so that high-contrast display is achieved both in reflective display and in transmissive display. In addition, one pixel electrode 9 is divided into three sub-pixels 29a and 29b, and the dielectric projections 18 are provided corresponding to the centers of the sub-pixels. Therefore, when a voltage is applied, the liquid crystal molecules 51 are radially aligned, centered on the dielectric projections 18 in the image display region, which makes it possible to perform display with a wider viewing angle.

Further, in this embodiment, the non-forming regions (non-colored regions) HR, HG, and HB of the color filters 22 are provided in the reflective display regions R to reduce a difference in the shade of color between reflected light and transmitted light. Therefore, it is possible to achieve bright, high-visibility display both in the reflective mode and in the transmissive mode. Also, in this embodiment, the dielectric projections 18 are arranged at positions overlapping the non-colored regions of the color filters 22 in plan view, and the dielectric projections are buried in the concave portions P of the substrate formed by the non-colored regions, which makes it possible to decrease the height of the projections in practice. As a result, it is possible to make the liquid crystal molecules around the projections contribute to display, and thus to perform good alignment control both in the reflective display region R and in the transmissive display region T.

Furthermore, in this embodiment, the area ratios of the colored regions to the non-colored regions of the color filters 22R, 22G, and 22B are varied for every color. In this case, it is possible to achieve display having high color reproducibility in the reflective display mode using external light that is not controlled, by determining these area ratios according to the spectral characteristics of external light. In addition, it is possible to achieve display having high color reproducibility in the transmissive mode, by determining these area ratios according to the spectral characteristics of illumination light emitted from, for example, a backlight.

Second Embodiment

Liquid Crystal Display Device

Figure 5:
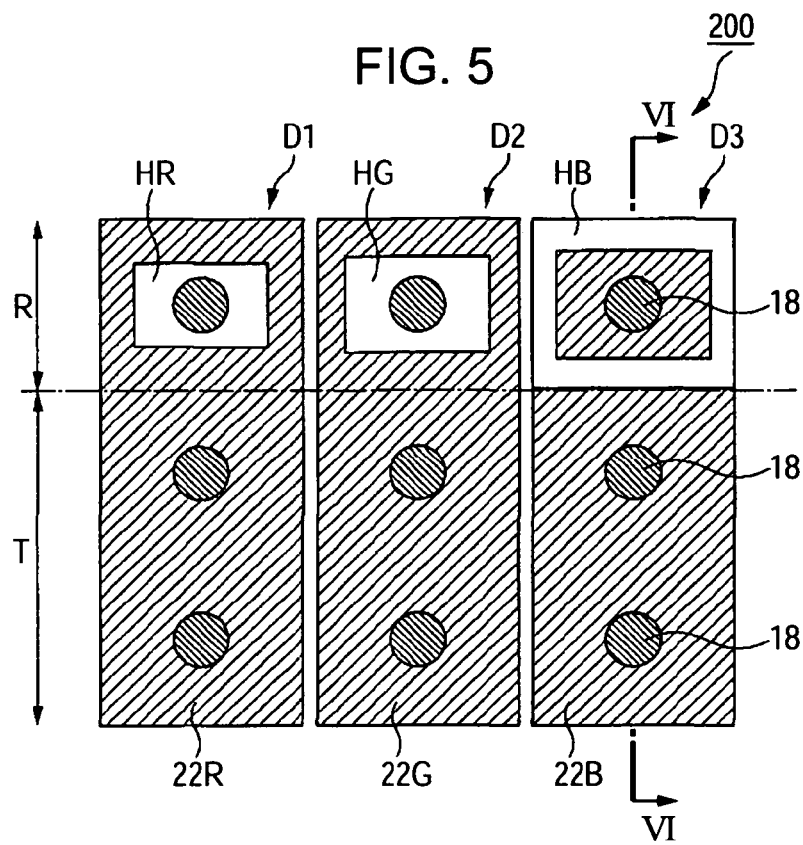
FIG. 5 is a plan view illustrating the structure of one pixel region of a liquid crystal display device according to a second embodiment of the invention.
Figure 6:
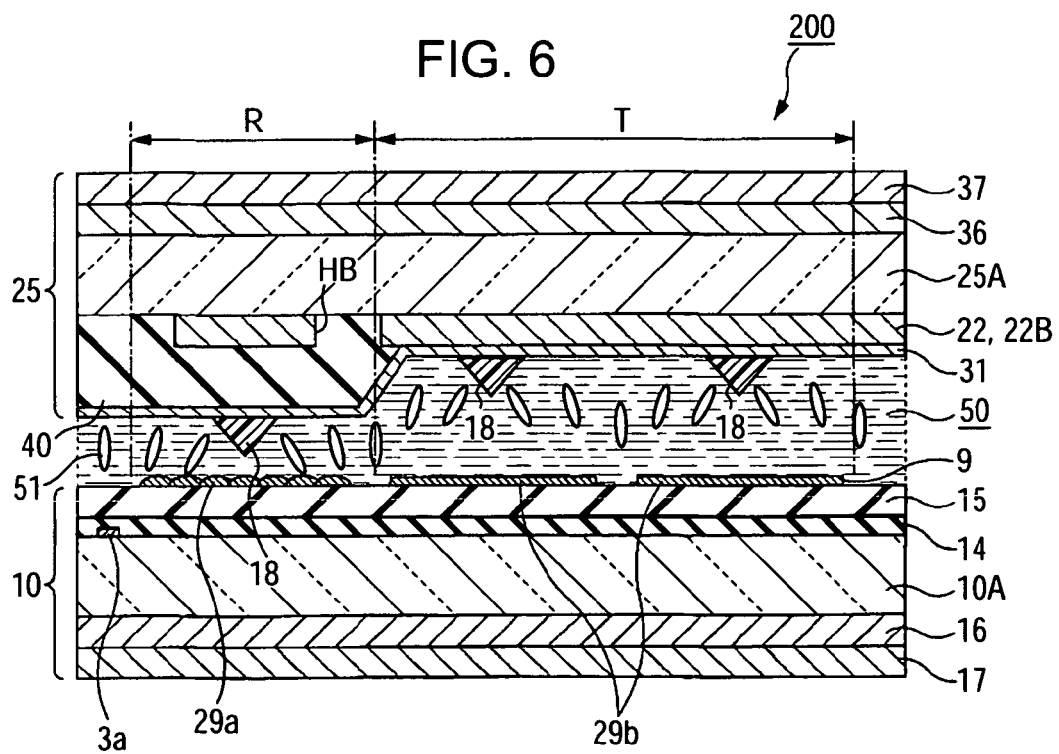
FIG. 6 is a cross-sectional view taken along the line VI-VI of FIG. 5.

Next, a second embodiment of the invention will be described. FIG. 5 is a view illustrating the structure of a liquid crystal display device 200 according to this embodiment, as viewed from a counter substrate, and specifically, is an enlarged plan view schematically illustrating one pixel region. FIG. 6 is a view schematically illustrating the sectional structure of the liquid crystal display device 200, and specifically, is a partially sectional view taken along the line VI-VI of FIG. 5. In addition, in this embodiment, the same members or parts as those in the first embodiment have the same reference numerals, and a description thereof will be omitted.

The second embodiment is different from the first embodiment in that the non-colored region of the blue color filter 22B is arranged around the edge of the reflective display region R and in that the dielectric projection 18 of the reflective display region R in the blue dot region D3 is laminated on the blue colored region arranged at the center of the reflective display region R. In this embodiment, the structure of the element substrate is completely the same as that in the first embodiment, and thus only the structure of the counter substrate will be described.

As shown in FIGS. 5 and 6, a counter substrate 25 includes, as a base substrate, a substrate body 25A made of a transparent material, such as quartz or glass. Color filters (color filter layers) 22 are formed on an inner surface of the substrate body 25A so as to be laid across the reflective display regions R and the transmissive display regions T. The color filters 22 are composed of plural types of color filters (colored layers) 22R, 22G, and 22B having different colors, and a light-shielding layer (black matrix) made of, for example, a black resin is formed among the respective color filters 22R, 22G, and 22B constituting the color filters 22, if necessary. A rectangular opening region not having a coloring material therein (non-colored region) HR is formed in the red color filter 22R at a position corresponding to the center of the sub-pixel 29*a* for reflective display. Similarly, a rectangular opening region not having a coloring material therein (non-colored region) HG is formed in the green color filter 22G at a position corresponding to the center of the sub-pixel 29*a* for reflective display. A frame-shaped opening region not having a coloring material therein (non-colored region) HB is formed in blue color filter 22B at a position corresponding to the outer periphery of the sub-pixel 29*a* for reflective display. The area ratio of the colored region having a coloring material arranged therein to the non-colored region not having a coloring material arranged therein (the colored region/the non-colored region) is set to be most suitable for the respective colors of R, G, and B in consideration of the color balance of each color. For example, in this embodiment, the green color filter 22G (that is, the non-colored region HG) having a high degree of luminosity has the largest area of the non-colored region, followed by the red color filter 22R and the blue color filter 22B in this order. Accordingly, the blue color filter 22B has the highest area ratio, followed by the red color filter 22R and the green color filter 22G in this order.

An insulating film 40 is selectively formed on the inner surface of the color filter 22, corresponding to the reflective display region R. Since the insulating film 40 is partially formed in the dot regions, the thicknesses of the liquid crystal layer 50 are different from each other in the reflective display region R and the transmissive display region T. The insulating film 40 is made of an organic material, such as acrylic resin. The insulating film 40 is formed with, for example, a thickness of about 2 μm±1 μm, and the thickness of the liquid crystal layer 50 in a region where the insulating film 40 is not provided is about 2 to 6 μm. The thickness of the liquid crystal layer 50 in the reflective display region R is half that of the liquid crystal layer 50 in the transmissive display region T. That is, the insulating film 40 functions as a liquid-crystal-layer-thickness adjusting layer to cause the thicknesses of the liquid crystal layer 50 to be different from each other in the reflective display region R and the transmissive display region T, thereby realizing a multi-gap structure. In this way, the liquid crystal display device 200 of this embodiment can achieve bright, high-contrast display. In addition, an inclined surface in which the thickness of the insulating film 40 is continuously varied is formed around the boundary between the reflective display region R and the transmissive display region T. In addition, the inclined surface substantially overlaps an edge portion of the reflective electrode 29*a* at the center of the dot region in plan view, and also overlaps a linear electrode film (connecting portion) for connecting adjacent sub-pixels.

Concave portions P (see FIG. 3) are respectively formed in the surface of the insulating film 40 in the non-colored regions HR and HG of the red color filter 22R and the green color filter 22G, corresponding to the unevenness of the color filter 22. That is, step portions are formed in the insulating film 40 by a thickness corresponding to a portion that is not planarized by the insulating film 40, at the centers of the reflective display regions R of a red dot region D1 and a green dot region D2, and the step portions appear on the surface of the insulating film 40 as the concave portions P. The concave portion P causes the gap of the liquid crystal layer at the center of the reflective display region R to be greater than that of the liquid crystal layer in the periphery thereof in the red dot region D1 and the green dot region D2. On the other hand, the non-colored region HB is arranged corresponding to the edge of the reflective display region R in the blue color filter 22B, and thus the concave portion is not formed at the center of the reflective display region R.

Further, a counter electrode 31 is formed on the inner surface of the substrate body 25A so as to cover the color filters 22 and the insulating film 40. The counter electrode 31 is a conductive film made of a transparent material, such as ITO, and the dielectric projections 18 protruding toward the liquid crystal layer 50 are provided on the counter electrode 31 at positions facing the pixel electrodes 9. Although the dielectric projection 18 is shown to have substantially a triangular shape in sectional view in the drawings, it is practically formed in a hemispherical shape. The dielectric projections 18 are formed corresponding to the centers of the two sub-pixels 29*b* in the transmissive display region T, respectively, and one dielectric projection 18 is formed corresponding to the center of the sub-pixel 29*a* in the reflective display region R. The dielectric projection 18 of the reflective display region R is arranged in the concave portion P formed in the insulating film 40 in the red dot region D1 and the green dot region D2. On the other hand, since the concave portion is not provided in the blue dot region D3, the dielectric projection 18 is arranged on a flat surface. These dielectric projections 18 are made of a dielectric material, such as resin, and can be formed by a photolithography technique using a mask. In this embodiment, the dielectric projections 18 are collectively formed with a height of 1.2 μm and a diameter of 12 μm in the reflective display region R and the transmissive display region T using a positive resist made of a novolac-based material. After the resist is developed, post-baking is performed at a temperature of 220° C., thereby obtaining hemispherical projections. The dielectric projection 18 is formed with a height most suitable for transmissive display, and is formed with a relatively large height in the reflective display region R.

Although not shown, a vertical alignment film made of, for example, polyimide is formed so as to cover the counter electrode 31 and the dielectric projections 18 to cause the liquid crystal molecules 51 to be vertically aligned with respect to the substrates in their initial states. In this embodiment, the structure on the outer side of the substrate body 25A is the same as that in the first embodiment.

Display Operation

Next, a display operation of the liquid crystal display device 200 of this embodiment will be described. Since the operation of the liquid crystal display device in the transmissive mode is the same as that in the first embodiment, only the operation of the liquid crystal display device in the reflective mode will be described.

In the reflective mode, external light incident from the outer side of the counter electrode 25 is converted into circularly polarized light while passing through the polarizing plate 37 and the retardation plate 36, and is then incident on the liquid crystal layer 50. Since the liquid crystal molecules vertically aligned with respect to the substrates when no voltage is applied have no refractive index anisotropy, the circularly-polarized light travels through the liquid crystal layer 50 to the sub-pixel 29*a* (reflective electrode). Then, the light is reflected from the sub-pixel 29*a* to return to the liquid crystal layer 50, and is then incident on the retardation plate 36 again. In this case, since the rotation direction of the circularly polarized light reflected from the sub-pixel 29*a* is reversed, the light is converted into linearly polarized light whose transmission axis is orthogonal to the transmission axis of the polarizing plate 37 by the retardation plate 36. In addition, since the linearly polarized light does not pass through the polarizing plate 37, black display is performed in the liquid crystal display device 200 of this embodiment when no voltage is applied (normally black mode).

Meanwhile, when a voltage is applied to the liquid crystal layer 50, the liquid crystal molecules are aligned so as to be inclined with respect to the substrates, so that they have refractive index anisotropy with respect to transmission light. Therefore, the circularly polarized light incident on the liquid crystal layer 50 from the outer side of the counter substrate 25 is converted into linearly polarized light while passing through the liquid crystal layer 50, and then reaches the sub-pixel 29a (reflective electrode). Then, the light is reflected from the sub-pixel 29a, and then passes through the liquid crystal layer 50 to be incident on the retardation plate 36 again. Since the reflected light is circularly polarized light having the same rotation direction as the previously incident light, it is converted into linearly polarized light whose transmission axis is parallel to the transmission axis of the polarizing plate 37 by the retardation plate 36, and then passes through the polarizing plate 37. Therefore, in the liquid crystal display device 200 of this embodiment, white display is performed when a voltage is applied. In addition, it is possible to perform gray-scale display by adjusting the voltage applied to the liquid crystal layer 50 in the above-mentioned structure. In this case, in this embodiment, since the dielectric projections 18 are arranged corresponding to the centers of the sub-pixels 29a, respectively, the liquid crystal molecules 51 are vertically aligned with respect to the outlines of the sub-pixels 29a. In addition, the liquid crystal molecules 51 are vertically aligned with respect to the inclined surfaces of the dielectric projections 18 in the vicinities of the dielectric projections 18 when no voltage is applied. On the other hand, when a voltage is applied, as shown in FIG. 6, the liquid crystal molecules 51 are inclined from the dielectric projections 18 toward the outer sides thereof. That is, the liquid crystal molecules 51 are aligned in the radial direction of each dielectric projection 18 in plan view. Therefore, the liquid crystal display device 200 of this embodiment can display an image at a wider viewing angle by allowing directors of the liquid crystal molecules 51 to be aligned in all directions when a voltage is applied. In addition, external light passes through the color filters 22 two times when it is incident and exits. However, since the non-colored regions HR, HG, and HB are formed in the color filters 22, colored light is not made dark. That is, since the non-colored regions HR, HG, and HB are provided in a portion of a region overlapping the sub-pixel 29a in plan view, a mixture of non-colored light passing through the non-colored regions and colored light passing through the colored regions is obtained in the reflective mode. Therefore, the color of the colored light tones down by the non-colored light, so that light having the same color as that in the transmissive mode is emitted.

Further, in this embodiment, since the dielectric projections 18 of the reflective display regions R of the red dot region D1 and the green dot region D2 are arranged in the concave portions P formed by the non-colored regions HR and HG, the thickness of the liquid crystal layer on the upper side of the dielectric projection 18 is maintained to be large, compared to a case in which the dielectric projection is provided on a flat surface not having the concave portion P. Therefore, the liquid crystal molecules in the vicinities of the projections can sufficiently contribute to retardation, which makes it possible to increase the area of a region actually contributing to display.

Meanwhile, since the dielectric projections are formed on the flat surface not having the concave portions therein in the blue dot region D3, a gap between the dielectric projection 18 and the element substrate 10 becomes excessively narrow. Therefore, the liquid crystal molecules in the vicinities of the projections do not contribute to display in practice (that is, a desired gray-scale display is not performed). However, when a high voltage is applied, the liquid crystal molecules around the projections contribute to bright display. Therefore, the liquid crystal molecules function to shield light around the projections when a low voltage is applied and to transmit light around the projections when a high voltage is applied. That is, the liquid crystal molecules around the projections serve as valves for adjusting transmittance (that is, the shade of colored light) according to the applied voltage. Thus, the conventional vertical alignment mode has problems in that a shift in color from white to blue occurs when a low voltage is applied, and a shift in color from white to yellow occurs as a voltage is changed from a low level to a high level. However, in this embodiment, the amount of blue colored light is small when a low voltage is applied, and is large when a high voltage is applied (that is, a dark color is reduced when a low voltage is applied, and a light color is enhanced when a high voltage is applied). Therefore, it is possible to obtain high color reproducibility in display, regardless of a voltage to be applied.

As described above, since the liquid crystal display device 200 of this embodiment also adopts the multi-gap structure, it is possible to achieve high-contrast display both in reflective display and in transmissive display. In addition, since one dot is divided into a plurality of island-shaped sub-pixels, it is possible to perform display at a wider viewing angle in all directions. Further, since a portion of the color filter 22 is opened to form a non-colored region, not having a coloring material arranged therein, in the reflective display region, it is possible to reduce a difference in the shade of color between the reflective mode and the transmissive mode. In addition, in this embodiment, the relative positional relationship between the dielectric projection 18 and the non-colored region of the color filter 22 is varied for every color. Therefore, it is possible to solve the problem of a variation in color due to chromatic dispersion, which is raised in the related art, and thus to achieve display having high color reproducibility regardless of a voltage to be applied.

Third Embodiment

Liquid Crystal Display Device

Figure 7A:
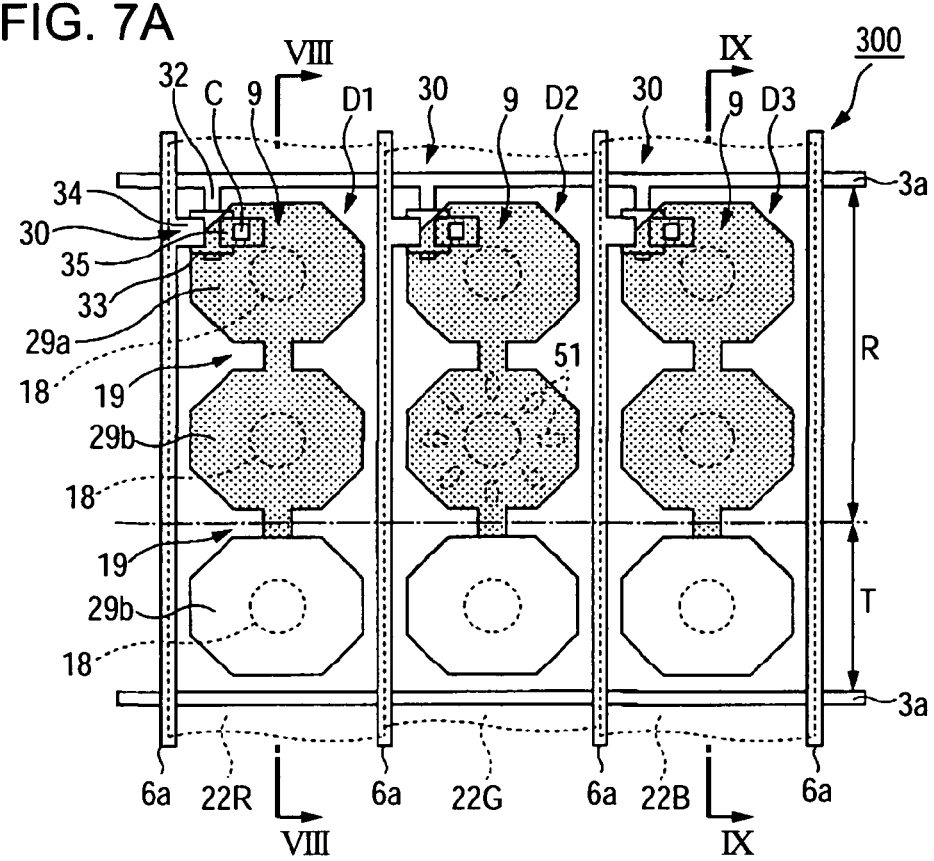
FIGS. 7A and 7B are plan views illustrating the structure of one pixel of a liquid crystal display device according to a third embodiment of the invention.
Figure 7B:
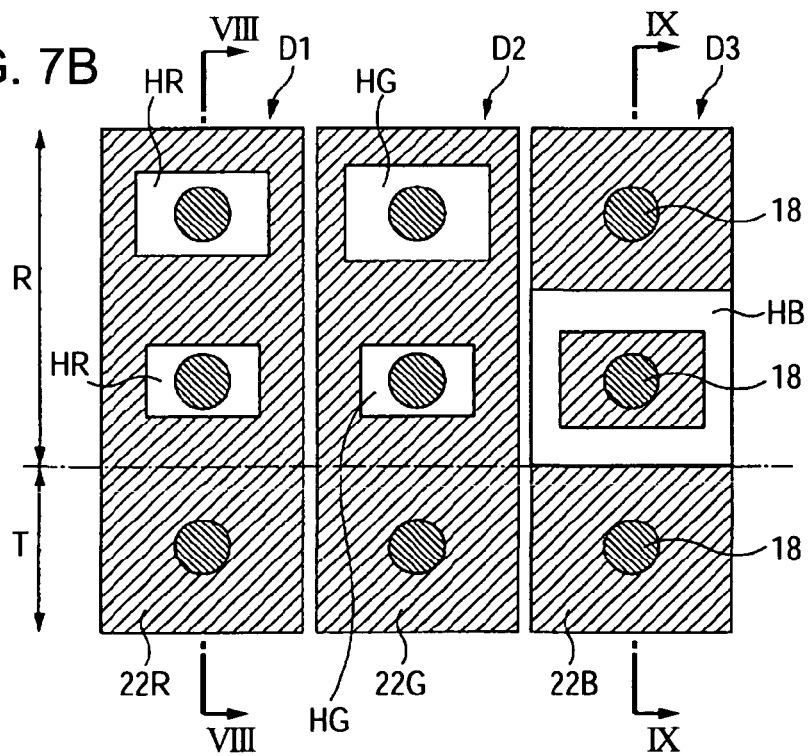

Next, a third embodiment of the invention will be described. FIGS. 7A and 7B are plan views illustrating the structure of one pixel of a liquid crystal display device 300 according to this embodiment. Specifically, FIG. 7A is a plan view illustrating the structure of one pixel, as viewed from an element substrate, and FIG. 7B is a plan view illustrating the structure of one pixel, as viewed from a counter substrate. FIG. 8 is a cross-sectional view illustrating the structure of the liquid crystal display device 300, and specifically, is a partially sectional view taken along the line VIII-VIII of FIG. 7. FIG. 9 is a cross-sectional view illustrating the structure of the liquid crystal display device 300, and specifically, is a partially sectional view taken along the line IX-IX of FIG. 7. In addition, in this embodiment, the same members or parts as those in the second embodiment have the same reference numerals, and a description thereof will be omitted.

The third embodiment is different from the second embodiment in that two upper sub-pixels of three sub-pixels are used for reflective display and the shape, arrangement, and number of non-colored regions of R, G, and B color filters are changed corresponding thereto. Other structures are the same as those in the second embodiment.

As shown in FIG. 7A, in the liquid crystal display device 300 of this embodiment, each of the pixel electrodes 9 provided in the dot regions D1 to D3 is divided into a plurality (in this embodiment, three) of sub-pixels (island-shaped portions) 29a and 29b by slits 19 provided in the respective dot regions, and the sub-pixels are connected to each other at the central portions (by connecting portions). Two sub-pixels 29a located at the upper side of FIG. 7A are composed of a reflective metal film made of, for example, Al (aluminum) or Ag (silver), or a laminated structure including such a metal film and a conductive film made of a transparent material, such as ITO (indium tin oxide). These sub-pixels 29a function as reflective electrodes, and a region in which the sub-pixels 29a are formed serves as a reflective display region R. The reflective electrode has unevenness on a surface thereof, and the unevenness causes reflected light to be scattered, which makes it possible to perform display with high visibility. In addition, a sub-pixel 29b located at the lower side of FIG. 7A is composed of a conductive film made of a transparent material, such as ITO (indium tin oxide), and a region in which the sub-pixel 29b is formed serves as a transmissive display region T. That is, the liquid crystal display device 300 of this embodiment is a transflective liquid crystal display device in which one dot region includes the reflective display region R for performing reflective display and the transmissive display region T for performing transmissive display and in which about two thirds of a display region contributes to reflective display and one third thereof contributes to transmissive display. In FIGS. 7A and 7B, boundaries between the reflective display regions R and the transmissive display regions T are represented by a one-dot chain line. Further, the connecting portions between the sub-pixels are composed of a reflective metal film made of, for example, Al (aluminum) or Ag (silver), or a laminated structure including such a metal film and a conductive film made of a transparent material, such as ITO (indium tin oxide), and also contribute to reflective display. Dielectric projections 18, which are alignment regulators for regulating the alignment of liquid crystal, are provided at the centers of the sub-pixels 29a and 29b, respectively. In addition, the respective sub-pixels 29a and 29b are chamfered to have substantially octagonal or circular shapes in plan view.

As shown in FIG. 7B, color filters 22 are composed of plural types of color filters (colored layers) 22R, 22G, and 22B having different colors, and a light-shielding layer (black matrix) made of a black resin is formed among the respective color filters 22R, 22G, and 22B constituting the color filters 22, if necessary. Rectangular opening regions not having a coloring material therein (non-colored regions) HR are formed in the red color filter 22R at positions corresponding to the centers of the sub-pixels 29a for reflective display, respectively. Similarly, rectangular opening regions not having a coloring material therein (non-colored region) HG are formed in the green color filter 22G at positions corresponding to the centers of the sub-pixels 29a for reflective display, respectively. The shape and arrangement (an alignment relationship with the dielectric projections 18) of two non-colored regions formed in each of the red dot region D1 and the green dot region D2 can be arbitrarily designed. That is, the two sub-pixels 29a may have the same shape and arrangement, or different shapes and arrangements. In this embodiment, for example, the sub-pixels have different shapes and arrangements, and the sub-pixels in the red dot region D1 have different shapes from those in the green dot region D2. A rectangular frame-shaped opening region not having a coloring material therein (non-colored region) HB is formed in blue color filter 22R at a position corresponding to the outer periphery of one sub-pixel 29a (that is, the sub-pixel 29a adjacent to the sub-pixel 29b for transmissive display) located at the lower side of FIG. 7B of two sub-pixels for reflective display. The area ratio of the colored region having a coloring material arranged therein to the non-colored region not having a coloring material arranged therein (the colored region/the non-colored region) is set to be most suitable for the respective colors of R, G, and B in consideration of the color balance of each color. For example, in this embodiment, the green color filter 22G (that is, the non-colored region HG) having a high degree of luminosity has the largest area of the non-colored region, followed by the red color filter 22R and the blue color filter 22B in this order. Accordingly, the blue color filter 22B has the highest area ratio, followed by the red color filter 22R and the green color filter 22G in this order.

As shown in FIGS. 8 and 9, the insulating film 40 is selectively formed on the inner surface of the color filter 22, corresponding to the reflective display region R. Since the insulating film 40 is partially formed in the dot regions, the thicknesses of the liquid crystal layer 50 are different from each other in the reflective display region R and the transmissive display region T. The insulating film 40 is composed of a film made of an organic material, such as acrylic resin. The insulating film 40 is formed with a thickness of about 2 μm±1 μm, and the thickness of the liquid crystal layer 50 in a region where the insulating film 40 is not provided is about 2 to 6 μm. The thickness of the liquid crystal layer 50 in the reflective display region R is half that of the liquid crystal layer 50 in the transmissive display region T. That is, the insulating film 40 functions as a liquid-crystal-layer-thickness adjusting layer to cause the thicknesses of the liquid crystal layer 50 to be different from each other in the reflective display region R and the transmissive display region T, thereby realizing a multi-gap structure. In this way, the liquid crystal display device 300 of this embodiment can achieve bright, high-contrast display. In addition, an inclined surface in which the thickness of the insulating film 40 is continuously varied is formed around the boundary between the reflective display region R and the transmissive display region T. Further, the inclined surface substantially overlaps an edge portion of the reflective electrode 29a at the center of the dot region in plan view, and also overlaps a linear electrode film (connecting portion) for connecting adjacent sub-pixels.

Concave portions P are respectively formed in the surface of the insulating film 40 in the non-colored regions HR of the red color filter 22R and in the non-colored regions HG of the green color filter 22G, corresponding to the unevenness of the color filters 22 (see FIG. 8). That is, step portions are formed in the insulating film 40 by a thickness corresponding to a portion that is not planarized by the insulating film 40, at the centers of the reflective display regions R of the red dot region D1 and the green dot region D2, and the step portions appear on the surface of the insulating film 40 as the concave portions P. The concave portion P causes the gap of the liquid crystal layer at the center of the reflective display region R to be greater than that of the liquid crystal layer in the periphery thereof in the red dot region D1 and the green dot region D2. On the other hand, the non-colored region HB is arranged corresponding to the edge of the reflective display region R in the blue color filter 22B, and thus the concave portion is not formed at the center of the reflective display region R (see FIG. 9).

Further, a counter electrode 31 is formed on the inner surface of the substrate body 25A so as to cover the color filters 22 and the insulating film 40. The counter electrode 31 is a conductive film made of a transparent material, such as ITO, and the dielectric projections 18 protruding toward the liquid crystal layer 50 are provided on the counter electrode 31 at positions facing the pixel electrodes 9. Although the dielectric projection 18 is shown to have substantially a triangular shape in sectional view in the drawings, it is practically formed in a hemispherical shape. One dielectric projection 18 is formed corresponding to the center of the sub-pixel 29b in the transmissive display region T, and two dielectric projections 18 are formed corresponding to the centers of the sub-pixels 29a in the reflective display region R, respectively. The dielectric projections 18 of the reflective display regions R are arranged in the concave portions P formed in the insulating film 40 in the red dot region D1 and the green dot region D2 (see FIG. 8). On the other hand, since the concave portion is not provided in the blue dot region D3, the dielectric projection 18 is arranged on a flat surface (see FIG. 9). These dielectric projections 18 are made of a dielectric material, such as resin, and can be formed by a photolithography technique using a mask. In this embodiment, the dielectric projections 18 are collectively formed with a height of 1.2 μm and a diameter of 12 μm in the reflective display region R and the transmissive display region T using a positive resist made of a novolac-based material. After the resist is developed, post-baking is performed at a temperature of 220° C., thereby obtaining hemispherical projections. The dielectric projection 18 is formed with a height most suitable for transmissive display, and is formed with a relatively large height in the reflective display region R.

Although not shown, a vertical alignment film made of, for example, polyimide is formed so as to cover the counter electrode 31 and the dielectric projections 18 to cause the liquid crystal molecules 51 to be vertically aligned with respect to the substrates in their initial states. In this embodiment, the structure on the outer side of the substrate body 25A is the same as that in the first embodiment. Also, in this embodiment, a display operation is the same as that in the second embodiment except that the connecting portions between the sub-pixels contribute to display, and thus a description thereof will be omitted.

As described above, since the liquid crystal display device 300 of this embodiment also adopts the multi-gap structure, it is possible to achieve high-contrast display both in reflective display and in transmissive display. In addition, since one dot is divided into a plurality of island-shaped sub-pixels, it is possible to perform display at a wider viewing angle in all directions. Further, since a portion of the color filter 22 is opened to form a non-colored region, not having a coloring material arranged therein, in the reflective display region, it is possible to reduce a difference in the shade of color between the reflective mode and the transmissive mode. In addition, in this embodiment, the relative positional relationship between the dielectric projection 18 and the non-colored region of the color filter 22 is varied for every color. Therefore, it is possible to solve the problem of a variation in color due to chromatic dispersion, which is raised in the related art, and thus to achieve display having high color reproducibility regardless of a voltage to be applied. Further, in this embodiment, two sub-pixels 29a for reflective display are provided in one dot region, and the connecting portions between the sub-pixels contribute to reflective display, which makes it possible to achieve bright reflective display. In addition, since a plurality of sub-dots for reflective display is provided, the degree of freedom in color arrangement is improved. Therefore, it is possible to effectively perform color adjustment by, for example, separately arranging a colored region and a non-colored region in each sub-dot (by, for example, arranging the non-colored region at the center of a sub-pixel and the non-colored region in the outer periphery of another sub-pixel, or by changing the shape and arrangement of the non-colored region for every sub-pixel).

Fourth Embodiment

Liquid Crystal Display Device

Figure 10A:
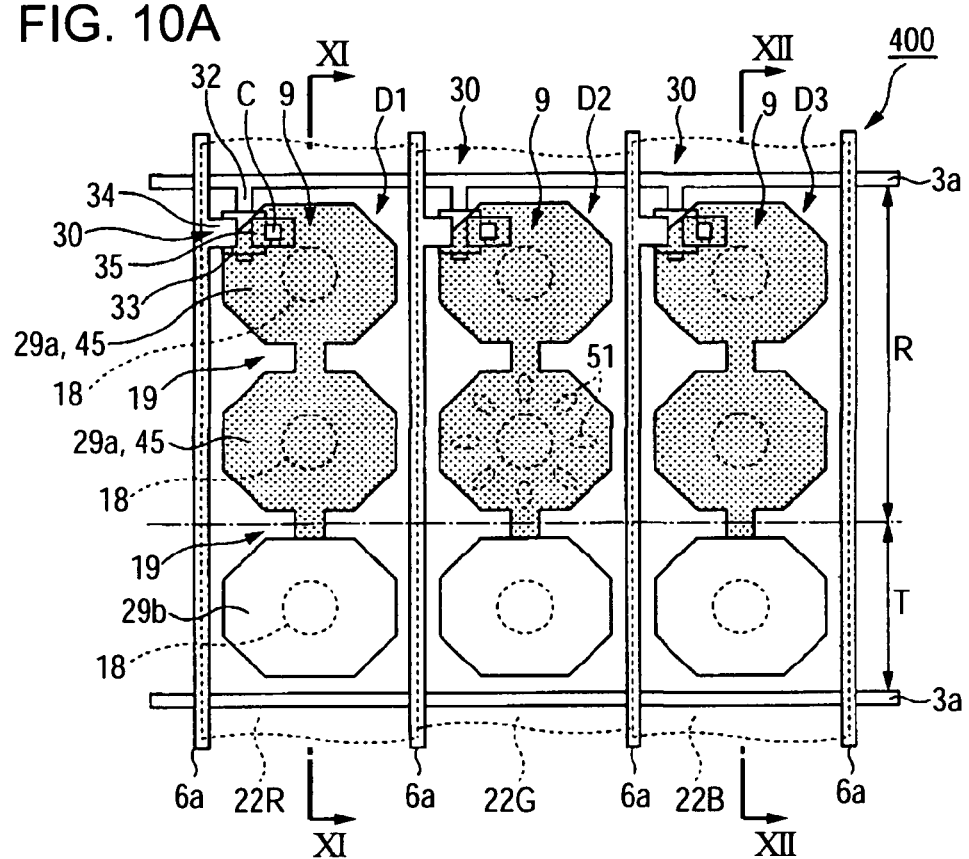
FIGS. 10A and 10B are plan views illustrating the structure of one pixel of a liquid crystal display device according to a fourth embodiment of the invention.
Figure 10B:
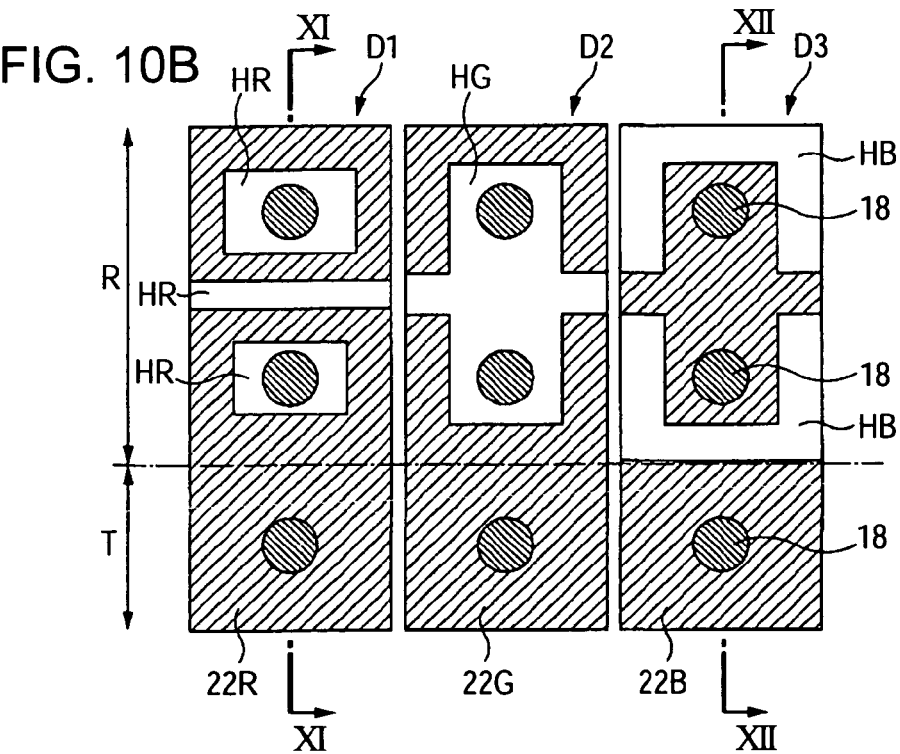
Figure 11:
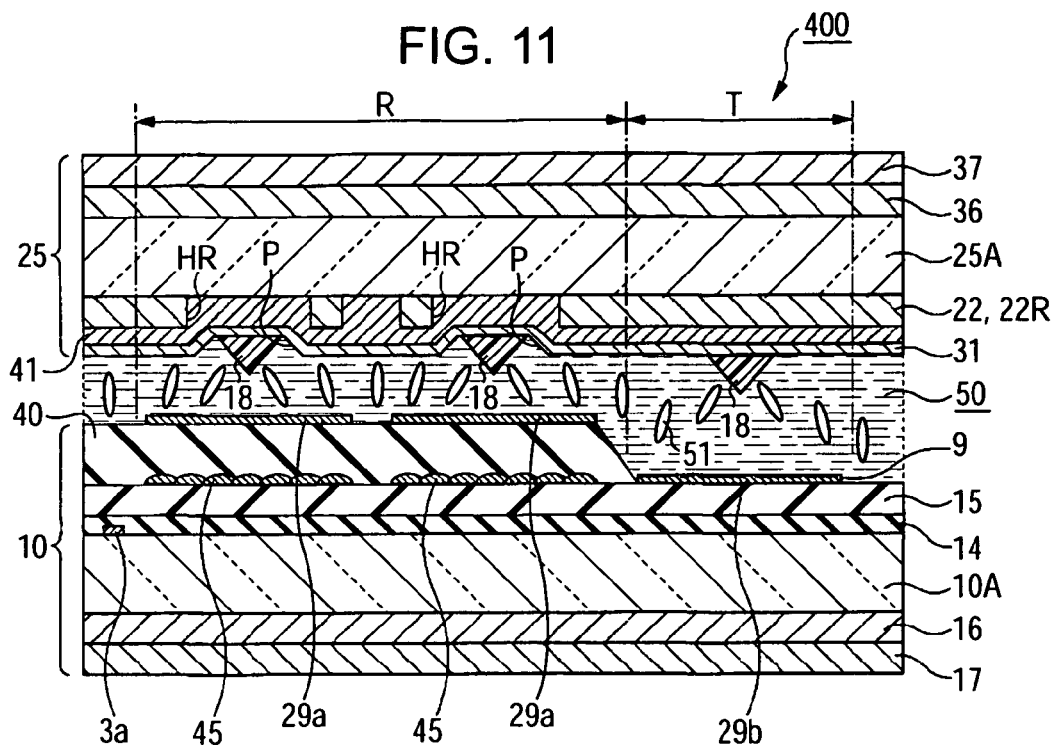
FIG. 11 is a cross-sectional view taken along the line XI-XI of FIG. 10.
Figure 12:
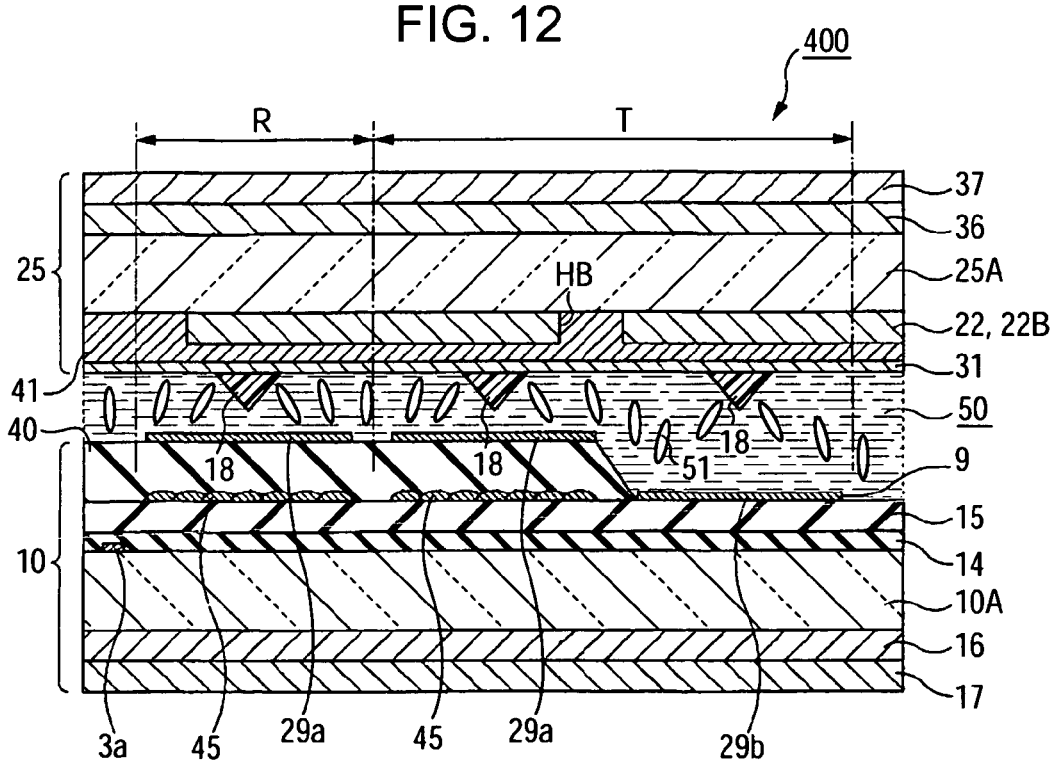
FIG. 12 is a cross-sectional view taken along the line XII-XII of FIG. 10.

Next, a fourth embodiment of the invention will be described. FIGS. 10A and 10B are plan views illustrating the structure of one pixel of a liquid crystal display device 400 according to this embodiment. Specifically, FIG. 10A is a plan view illustrating the structure of one pixel, as viewed from an element substrate, and FIG. 10B is a plan view illustrating the structure of one pixel, as viewed from a counter substrate. FIG. 11 is a cross-sectional view illustrating the structure of the liquid crystal display device 400, and specifically, is a partially cross-sectional view taken along the line XI-XI of FIGS. 10A and 10B. FIG. 12 is a cross-sectional view illustrating the structure of the liquid crystal display device 400, and specifically, is a partially cross-sectional view taken along the line XII-XII of FIGS. 10A and 10B. In addition, in this embodiment, the same members or parts as those in the third embodiment have the same reference numerals, and a description thereof will be omitted.

The fourth embodiment is different from the third embodiment in that an insulating film 40 for adjusting the thickness of a liquid crystal layer is provided on the element substrate and color filters are protected by an overcoat layer, in that sub-pixels for reflective display are divided into a sub-pixel having a reflective function and a sub-pixel having an electrode function and a reflective film having the electrode function is separately provided from a pixel electrode 9, and in that the shape, arrangement, and number of non-colored regions in each color filter are varied. Other structures are the same as those in the third embodiment.

As shown in FIG. 10A, in the liquid crystal display device 400 of this embodiment, each of the pixel electrodes 9 provided in dot regions D1 to D3 is divided into a plurality (in this embodiment, three) of sub-pixels (island-shaped portions) 29a and 29b by slits 19 provided in the respective dot regions, and the sub-pixels are connected to each other at the central portions (by connecting portions). The sub-pixels 29a and 29b and the connecting portions for connecting the sub-pixels are integrally formed by a conductive film made of a transparent material, such as ITO (indium tin oxide). Two sub-pixels 29a located at the upper side of FIG. 10A are arranged in a region where a reflective film 45 partially provided in each dot region is formed, and the other sub-pixel 29 located at the lower side is arranged in a region where the reflective film 45 is not formed. The plane region of the sub-pixels 29a arranged in the region where the reflective film 45 is formed serves as a reflective display region R of the liquid crystal display device 400, and the plane region 29b of the lower sub-pixel 29b serves as a transmissive display region T thereof. The reflective film 45 has unevenness on a surface thereof, and reflected light is scattered by the unevenness, which makes it possible to achieve display having high visibility. That is, the liquid crystal display device 400 of this embodiment is a transflective liquid crystal display device in which one dot region includes the reflective display region R for performing reflective display and the transmissive display region T for performing transmissive display and in which about two thirds of a display region contributes to reflective display and one third thereof contributes to transmissive display. In FIGS. 10A and 10B, boundaries between the reflective display regions R and the transmissive display regions T are represented by a one-dot chain line. Further, the reflective film 45 is also provided in regions where the connecting portions for connecting the sub-pixels are formed, so that the connecting portions also contribute to reflective display. Dielectric projections 18, which are alignment regulators for regulating the alignment of liquid crystal, are provided at the centers of the sub-pixels 29a and 29b, respectively. In addition, the respective sub-pixels 29a and 29b are chamfered to have substantially octagonal or circular shapes in plan view.

Meanwhile, in the sectional structure shown in FIGS. 11 and 12, the liquid crystal display device 400 includes an element substrate 10 and a counter substrate 25 opposite thereto, and a liquid crystal layer 50 composed of liquid crystal that has negative dielectric anisotropy (where a refractive index anisotropy Δn is, for example, 0.1) and is vertically aligned in an initial alignment state is interposed between the substrates 10 and 25. The liquid crystal layer 50 is formed substantially with a uniform thickness in a region in which the pixel electrodes 9 are formed, as shown in FIGS. 11 and 12. A backlight (not shown) having a light source, serving as an illuminating unit, a reflector, an optical waveguide, etc., is provided on an outer side of a liquid crystal cell opposite to an outer surface of the element substrate 10. A substantially bar-shaped ellipsoid denoted by reference numeral 51 conceptually represents a liquid crystal molecule that is vertically aligned.

The element substrate 10 includes, as a base substrate, a substrate body 10A made of a transmissive material, such as quartz or glass. Scanning lines 3a are formed on an inner surface (a surface facing the liquid crystal layer) of the substrate body 10A. A gate insulating film 14 is formed to cover the scanning lines 3a, and data lines 6a, etc., are formed on the gate insulating film 14 (see FIG. 10A). In addition, an interlayer insulating film 15 is formed to cover the data lines 6a, etc. The reflective film 45 composed of a metal film made of a reflective material, such as Al or Ag, is partially formed on the interlayer insulating film 15. It is preferable that the reflective film 45 be formed on an insulating film having unevenness thereon to have unevenness on a surface thereof. A region where the reflective film 45 is arranged serves as the reflective display region R. In addition, an insulating film 40 may be formed below the reflective film 45.

The insulating film 40 is selectively formed on the interlayer insulating film 15 so as to be positioned above the reflective film 45 (that is, so as to correspond to the reflective display region R). The insulating film 40 partially formed in the dot region causes the thicknesses of the liquid crystal layer 50 to be different from each other in the reflective display region R and the transmissive display region T. The insulating film 40 is composed of a film made of an organic material, such as acrylic resin. The insulating film 40 is formed with a thickness of about 2 μm±1 μm, and the thickness of the liquid crystal layer 50 in a region where the insulating film 40 is not provided is about 2 to 6 μm. The thickness of the liquid crystal layer 50 in the reflective display region R is half that of the liquid crystal layer 50 in the transmissive display region T. That is, the insulating film 40 functions as a liquid-crystal-layer-thickness adjusting layer to cause the thicknesses of the liquid crystal layer 50 to be different from each other in the reflective display region R and the transmissive display region T, thereby realizing a multi-gap structure. In this way, the liquid crystal display device 400 of this embodiment can achieve bright, high-contrast display. In addition, an inclined surface in which the thickness of the insulating film 40 is continuously varied is formed around the boundary between the reflective display region R and the transmissive display region T. In addition, the inclined surface substantially overlaps an edge portion of the reflective film 45 arranged at the center of the dot region in plan view, and also overlaps a linear electrode film (connecting portion) for connecting adjacent sub-pixels.

Further, pixel electrodes 9 made of a transparent conductive material, such as ITO, are formed on the element substrate 10 having the insulating film 40 thereon. Although not shown, a vertical alignment film made of, for example, polyimide is formed to cover the pixel electrodes 9, the insulating film 40, and the interlayer insulating film 15, so that the liquid crystal molecules 51 are vertically aligned with respect to the substrates in their initial states. In this embodiment, the structure on the outer side of the substrate body 10A is the same as that in the first embodiment.

The counter substrate 25 includes, as a base substrate, a substrate body 25A made of a transmissive material, such as quartz or glass. Color filters (color filter layers) 22 are formed on an inner surface of the substrate body 25A so as to be laid across the reflective display regions R and the transmissive display regions T.

As shown in FIG. 10B, the color filters 22 are composed of plural types of color filters (colored layers) 22R, 22G, and 22B having different colors, and a light-shielding layer (black matrix) made of a black resin is formed among the respective color filters 22R, 22G, and 22B constituting the color filters 22, if necessary. Rectangular opening regions (non-colored regions) HR not having a coloring material arranged therein are formed in the red color filter 22R at positions corresponding to the centers of the sub-pixels 29a for reflective display, respectively. The shape and arrangement (an arrangement relationship with the dielectric projections 18) of two non-colored regions HR formed in the red dot region D1 can be arbitrarily designed. That is, the two sub-pixels 29a may have the same shape and arrangement, or different shapes and arrangements. In this embodiment, for example, the sub-pixels have different shapes and arrangements. In addition, the opening region (non-colored region) HR is also formed in a portion corresponding to the connecting portion for connecting the sub-pixels 29a. The non-colored region HR formed in the connecting portion is formed in a strip shape extending in the horizontal direction of the connecting portion, and the stripe-shaped non-colored region HR causes the red color filter 22R in one dot region D1 to be separated in the vertical direction. A cross-shaped opening region (non-colored region) HG is formed at the center of the reflective display region R in the green color filter 22G. A portion of the non-colored region HG extending in the vertical direction is formed at positions corresponding to the centers of two sub-pixels 29a for reflective display and at a position where the sub-pixels 29a are connected to each other. In addition, a portion of the non-colored region HG extending in the horizontal direction is formed corresponding to the connecting portion for connecting the sub-pixels 29a. The non-colored region HG formed in the connecting portion is formed in a strip shape extending in the horizontal direction of the connecting portion, and the stripe-shaped non-colored region HG causes the green color filter 22G in one dot region D2 to be separated in the vertical direction. Two opening regions (non-colored regions) HB having 'U' shapes in plan view are formed in the outer periphery of the reflective display region R in the blue color filter 22B such that a cross-shaped colored region remains at the center of the reflective display region R. A vertically extending portion of the blue colored region arranged in the reflective display region R is formed at positions corresponding to the centers of two sub-pixels 29a for reflective display and at a position where the sub-pixels 29a are connected to each other. In addition, a horizontally extending portion of the blue colored region is formed corresponding to the connecting portion for connecting the sub-pixels 29a. The blue colored region formed in the connecting portion is formed in a strip shape extending in the horizontal direction of the connecting portion, and the stripe-shaped colored region causes the non-colored region HB of the blue color filter 22B in one dot region D3 to be separated in the vertical direction. The area ratio of the colored region having a coloring material arranged therein to the non-colored region not having a coloring material arranged therein (the colored region/the non-colored region) is set to be most suitable for the respective colors of R, G, and B in consideration of the color balance of each color. For example, in this embodiment, the green color filter 22G (that is, the non-colored region HG) having a high degree of luminosity has the largest area of the non-colored region, followed by the red color filter 22R and the blue color filter 22B in this order. Accordingly, the blue color filter 22B has the highest area ratio, followed by the red color filter 22R and the green color filter 22G in this order.

Referring to FIGS. 11 and 12 again, an overcoat layer 41 is provided on the color filters 22. Concave portions P (see FIG. 11) are respectively formed at positions corresponding to the non-colored regions HR of the red color filter 22R and the non-colored region HG of the green color filter 22G in the overcoat layer 41, corresponding to the uneven shapes of the color filters 22. That is, step portions are formed in the overcoat layer 41 by a thickness corresponding to a portion that is not planarized by the overcoat layer 41, at the centers of the reflective display regions R of the red dot region D1 and the green dot region D2, and the step portions appear on the surface of the overcoat layer 41 as the concave portions P. The concave portion P causes the gap of the liquid crystal layer at the center of the reflective display region R to be greater than that of the liquid crystal layer in the periphery thereof in the red dot region D1 and the green dot region D2. On the other hand, the non-colored region HB is arranged corresponding to the edge of the reflective display region R in the blue color filter 22, and thus the concave portion is not formed at the center of the reflective display region R therein (see FIG. 12).

Furthermore, a counter electrode 31 is formed on the inner surface of the substrate body 25A so as to cover the overcoat layer 41. The counter electrode 31 is a conductive film made of a transparent material, such as ITO, and the dielectric projections 18 protruding toward the liquid crystal layer 50 are provided on the counter electrode 31 at positions facing the pixel electrodes 9. Although the dielectric projection 18 is shown to have substantially a triangular shape in sectional view in the drawings, in practice, it is formed in a hemispherical shape. One dielectric projection 18 is formed corresponding to the center of the sub-pixel 29b in the transmissive display region T, and two dielectric projections 18 are formed corresponding to the centers of the sub-pixels 29a in the reflective display region R, respectively. The dielectric projections 18 of the reflective display regions R are arranged in the concave portions P formed in the overcoat layer 41 in the red dot region D1 and the green dot region D2 (see FIG. 11). On the other hand, since the concave portion is not provided in the blue dot region D3, the dielectric projection 18 is arranged on a flat surface (see FIG. 12). These dielectric projections 18 are made of a dielectric material, such as resin, and can be formed by a photolithography technique using a mask. In this embodiment, the dielectric projections 18 are collectively formed with a height of 1.2 μm and a diameter of 12 μm in the reflective display region R and the transmissive display region T using a positive resist made of a novolac-based material. After the resist is developed, post-baking is performed at a temperature of 220° C., thereby obtaining hemispherical projections. The dielectric projection 18 is formed with a height most suitable for transmissive display, and is formed with a relatively large height in the reflective display region R.

Although not shown, a vertical alignment film made of, for example, polyimide is formed so as to cover the counter electrode 31 and the dielectric projections 18 to cause the liquid crystal molecules 51 to be vertically aligned with respect to the substrates in their initial states. In this embodiment, the structure on the outer side of the substrate body 25A is the same as that in the first embodiment.

Display Operation

Next, a display operation of the liquid crystal display device 400 of this embodiment will be described. Since the operation of the liquid crystal display device in the transmissive mode is the same as that in the first embodiment, only the operation of the liquid crystal display device in the reflective mode will be described.

In the reflective mode, external light incident from the outer side of the counter electrode 25 is converted into circularly polarized light while passing through the polarizing plate 37 and the retardation plate 36, and is then incident on the liquid crystal layer 50. Since the liquid crystal molecules vertically aligned with respect to the substrates when no voltage is applied have no refractive index anisotropy, the circularly-polarized light travels through the liquid crystal layer 50 to the sub-pixel 29a (reflective electrode). Then, the light is reflected from the sub-pixel 29a to return to the liquid crystal layer 50, and is then incident on the retardation plate 36 again. In this case, since the rotation direction of the circularly polarized light reflected from the sub-pixel 29a is reversed, the light is converted into linearly polarized light whose transmission axis is orthogonal to the transmission axis of the polarizing plate 37 by the retardation plate 36. In addition, since the linearly polarized light does not pass through the polarizing plate 37, black display is performed in the liquid crystal display device 400 of this embodiment when no voltage is applied (normally black mode).

Meanwhile, when a voltage is applied to the liquid crystal layer 50, the liquid crystal molecules are aligned so as to be inclined with respect to the substrates, so that they have refractive index anisotropy with respect to transmission light. Therefore, the circularly polarized light incident on the liquid crystal layer 50 from the outer side of the counter substrate 25 is converted into linearly polarized light while passing through the liquid crystal layer 50, and then reaches the sub-pixel 29a (reflective electrode). Then, the light is reflected from the sub-pixel 29a, and passes through the liquid crystal layer 50 to be incident on the retardation plate 36 again. Since the reflected light is circularly polarized light having the same rotation direction as the previously incident light, it is converted into linearly polarized light whose transmission axis is parallel to the transmission axis of the polarizing plate 37 by the retardation plate 36, and then passes through the polarizing plate 37. Therefore, in the liquid crystal display device 400 of this embodiment, white display is performed when a voltage is applied. In addition, it is possible to perform gray-scale display by adjusting the voltage applied to the liquid crystal layer 50 in the above-mentioned structure. In this case, in this embodiment, since the dielectric projections 18 are arranged corresponding to the centers of the sub-pixels 29a, respectively, the liquid crystal molecules 51 are vertically aligned with respect to the outlines of the sub-pixels 29a. In addition, the liquid crystal molecules 51 are vertically aligned with respect to the inclined surfaces of the dielectric projections 18 in the vicinities of the dielectric projections 18 when no voltage is applied. On the other hand, when a votage is applied, as shown in FIGS. 11 and 12, the liquid crystal molecules 51 are inclined from the dielectric projections 18 toward the outer sides thereof. That is, the liquid crystal molecules 51 are aligned in the radial direction of each dielectric projection 18 in plan view. Therefore, the liquid crystal display device 400 of this embodiment can display image at a wider viewing angle by allowing directors of the liquid crystal molecules 51 to be aligned in all directions when a voltage is applied. In addition, external light passes through the color filters 22 two times when it is incident and exits. However, since the non-colored regions HR, HG, and HB are formed in the color filters 22, colored light is not made dark. That is, since the non-colored regions HR, HG, and HB are provided in a portion of a region overlapping the sub-pixel 29a in plan view, a mixture of non-colored light passing through the non-colored regions and colored light passing through the colored regions is obtained in the reflective mode. Therefore, the color of the colored light tones down by the non-colored light, so that light having the same color as that in the transmissive mode is emitted.

Further, in this embodiment, since the dielectric projections 18 of the reflective display regions R of the red dot region D1 and the green dot region D2 are arranged in the concave portions P formed by the non-colored regions HR and HG, the thickness of the liquid crystal layer on the upper side of the dielectric projection 18 is maintained to be larger, compared to a case in which the dielectric projection is provided on a flat surface not having the concave portion P. Therefore, the liquid crystal molecules in the vicinities of the projections can sufficiently contribute to retardation, which makes it possible to increase the area of a region contributing to display in practice.

Meanwhile, since the dielectric projections are formed on the flat surface not having the concave portions therein in the blue dot region D3, a gap between the dielectric projection 18 and the element substrate 10 becomes excessively narrow. Therefore, the liquid crystal molecules in the vicinities of the projections cannot contribute to display in practice (that is, desired gray-scale display cannot be performed). However, when a high voltage is applied, the liquid crystal molecules around the projections contribute to bright display. Therefore, the liquid crystal molecules function to shield light around the projections when a low voltage is applied, and to transmit light around the projections when a high voltage is applied. That is, the liquid crystal molecules around the projections serve as valves for adjusting transmittance (that is, the shade of colored light) according to the applied voltage. Thus, the vertical alignment mode used in the related art has problems in that a shift in color from white to blue occurs when a low voltage is applied, and a shift in color from white to yellow occurs as a voltage is changed from a low level to a high level. However, in this embodiment, the amount of blue colored light becomes small when a low voltage is applied, and becomes large when a high voltage is applied (that is, a dark color is reduced when a low voltage is applied, and a light color is enhanced when a high voltage is applied). Therefore, it is possible to obtain high color reproducibility in display, regardless of a voltage to be applied.

Further, in this embodiment, the non-colored regions HR and HG of the color filters 22R and 22G are formed in a region including the connecting portions between the sub-pixels 29a in the reflective display regions R of the red dot region D1 and the green dot region D2, and the colored region of the color filter 22B is formed in a region including the connecting portions between the sub-pixels 29a in the reflective display region R of the blue dot region D3. In this structure, when a low voltage is applied, liquid crystal molecules positioned in a region between the sub-pixels 29a (a region between island-shaped portions) does hardly contribute to bright display. Therefore, light is hardly emitted from the colored region that is arranged to overlap the region between the island-shaped portions in plan view, resulting in dark display (light color display). On the other hand, when a high voltage is applied, the liquid crystal molecules arranged in the region between the island-shaped portions also contribute to bright display. Therefore, the loss of light is reduced, and thus bright display (deep color display) is obtained. In the structure of this embodiment, the amount of blue light becomes small when a low voltage is applied, and the amount of blue light becomes large when a high voltage is applied (that is, a deep color tones down when a low voltage is applied, and a light color is enhanced when a high voltage is applied). Thus, the above-mentioned structure makes it possible to achieve display having high color reproducibility.

As described above, since the liquid crystal display device 400 of this embodiment also adopts the multi-gap structure, it is possible to achieve high-contrast display both in reflective display and in transmissive display. In addition, since one dot is divided into a plurality of island-shaped sub-pixels, it is possible to perform display at a wider viewing angle in all directions. Further, since a portion of the color filter 22 is opened to form a non-colored region, not having a coloring material arranged therein, in the reflective display region, it is possible to reduce a difference in the shade of color between the reflective mode and the transmissive mode. In addition, in this embodiment, the relative positional relationship between the dielectric projection 18 and the non-colored region of the color filter 22 is varied for every color. Therefore, it is possible to solve the problem of a variation in color due to chromatic dispersion, which has been raised in the related art, and thus to achieve display having high color reproducibility regardless of a voltage to be applied. Further, since the relative relationship between the non-colored region of the color filter 22 and the region between the island-shaped portions is varied for every color, it is possible to further suppress the effect of chromatic dispersion on colors. In addition, in this embodiment, two sub-pixels 29a for reflective display are provided in one dot region, and the connecting portions between the sub-pixels contribute to reflective display, which makes is possible to achieve bright reflective display. Further, since a plurality of sub-dots for reflective display is provided, the degree of freedom in color arrangement is improved. Therefore, it is possible to effectively perform color adjustment by, for example, separately arranging a colored region and a non-colored region in each sub-dot.

Fifth Embodiment

Liquid Crystal Display Device

Figure 13:
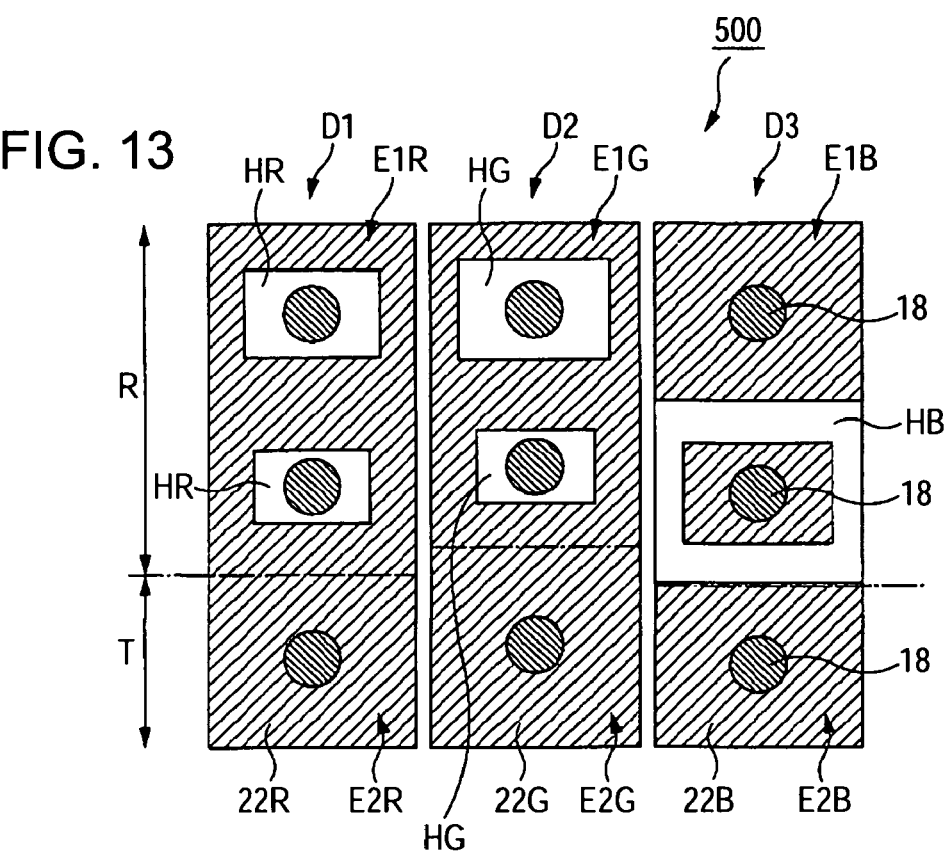
FIG. 13 is a plan view illustrating the structure of one pixel of a liquid crystal display device according to a fifth embodiment of the invention.

Next, a fifth embodiment of the invention will be described. FIG. 13 is an enlarged plan view schematically illustrating the structure of one pixel region of a liquid crystal display device 500 of this embodiment, as viewed from a counter substrate. In addition, in this embodiment, the same members or parts as those in the third embodiment have the same reference numerals, and a description thereof will be omitted.

The fifth embodiment is different from the third embodiment in that the area ratio of a reflective display region R to a transmissive display region T is varied for every color in one dot region. Other structures are the same as those in the third embodiment.

As shown in FIG. 13, in the liquid crystal display device 500 of this embodiment, sub-pixels have different shapes and arrangements in one dot region, which causes the area ratio of the reflective display region R to the transmissive display region T to be varied in each dot region D1 to D3. In FIG. 13, a boundary between the reflective display region R and the transmissive display region T in the respective dot regions D1 to D3 is represented by a one-dot chain line. Areas of the reflective display regions R of R, G, and B dots are represented by E1R, E1G, and E1B, respectively, and areas of the transmissive display regions T thereof are represented by E2R, E2G, and E2B, respectively. The area ratio of the reflective display region to the transmissive display region (the reflective display region/the transmissive display region) is set to be most suitable for R, G, and B in consideration of the color balance of each color. For example, in this embodiment, the green dot region D2 with a high degree of visibility has the smallest area of the reflective display region R, followed by the red dot region D1 and the blue dot region D3 in this order (E1B>E1R>E1G). Accordingly, the blue dot region D3 has the highest area ratio, followed by the green dot region D2 and the red dot region D1 in this order. In addition, The area ratio of the colored region having a coloring material arranged therein to the non-colored region not having a coloring material arranged therein (the colored region/the non-colored region) is set to be most suitable for R, G, and B in consideration of the color balance of each color. For example, in this embodiment, the green color filter 22R (that is, the non-colored region HG) with a high degree of visibility has the largest area of the non-colored region, followed by the red color filter 22R and the blue color filter 22B in this order. Accordingly, the blue color filter has the highest area ratio, followed by the red color filter 22R and the green color filter 22G in this order. In this structure, it is possible to suppress the emission of yellow colored light by allowing intense blue colored light to be emitted in reflective display. In addition, it is possible to adjust a color by using a backlight having an intense emission spectrum in a short wavelength in transmissive display.

Further, in this embodiment, a display operation is the same as that in the third embodiment, and thus a description thereof will be omitted.

As described above, in this embodiment, the area ratio of the colored region to the non-colored region of the color filters 22R, 22G, and 22B is varied for every color, and the area ratio of the reflective display region to the transmissive display region is varied for every color. Thus, it is possible to further improve color reproducibility in reflective display.

Electronic Apparatus

Figure 14:
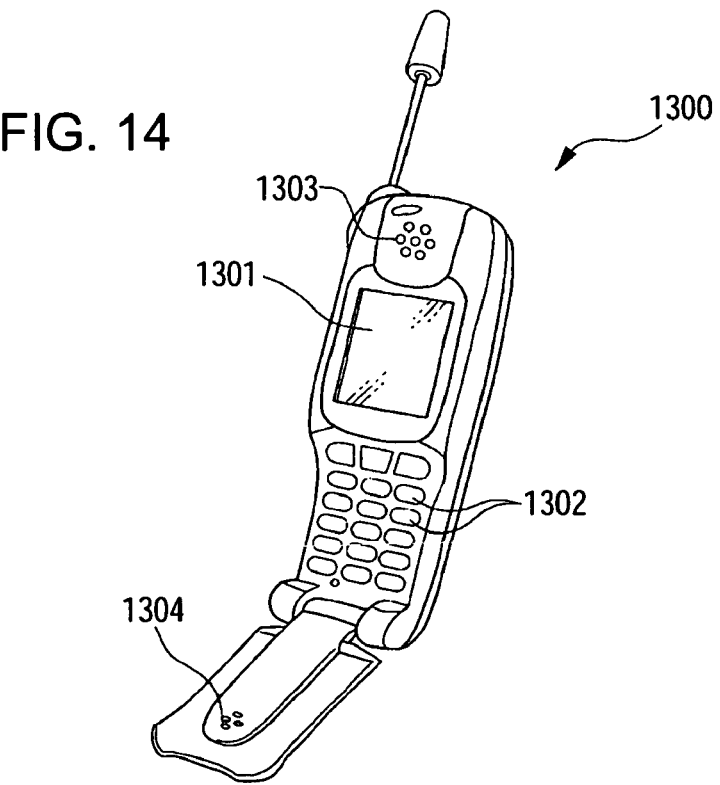
FIG. 14 is a perspective view illustrating an example of an electronic apparatus according to the invention.

FIG. 14 is a perspective view of an exemplary electronic apparatus according to the invention. A cellular phone 1300 shown in FIG. 14 includes the display device according to the invention as a small display unit 1301, a plurality of operation buttons 1302, a receiver unit 1303, and a transmitter unit 1304.

The display device according to the above-described embodiments can be applied as image display units of various electronic apparatuses, such as an electronic book, a personal computer, a digital still camera, a liquid crystal television, a view-finder-type or monitor-direct-view-type videotape recorder, a car navigation apparatus, a pager, an electronic organizer, an electronic calculator, a word processor, a workstation, a television phone, a POS terminal, and apparatuses including touch panels, in addition to the above-mentioned cellular phone. In this case, all the electronic apparatuses can perform bright, high-contrast transmissive/reflective display at a wider viewing angle.

Although a description has been given above of the preferred embodiments of the invention with reference to the accompanying drawings, the invention is not limited thereto. The shapes or arrangements of components and a combination thereof shown in the above-described embodiments are just illustrative examples, and can be changed or modified based on the design requirements, without departing from the scope or spirit of the invention.

For example, in the above-described embodiments, the liquid-crystal-layer-thickness adjusting layer or the color filters 22 can be arbitrarily arranged. That is, the liquid-crystal-layer-thickness adjusting layer may be formed on the element substrate or the counter substrate, or it may be formed on both sides. Similarly, the color filters 22 can be formed on the element substrate as well as on the counter substrate. For example, in the third embodiment, the color filters 22 may be formed between the reflective film 45 and the insulating film 40.

Further, in the first to third and fifth embodiments, the sub-pixel 29a for reflective display is made of a conductive material having a light-reflective property. However, as in the fourth embodiment, the electrodes may be made of a transparent conductive material, and a light-reflective film may be separately formed therefrom. On the contrary, in the fourth embodiment, the sub-pixels for reflective display may be made of a conductive material having a light-reflective property to remove the reflective film 45, as described in the first embodiment.

Furthermore, in the above-described embodiments, the dielectric projections 18 having substantially conic shapes, serving as members for regulating the alignment of liquid crystal, are arranged at the centers of the sub-pixels. However, instead of them, a wall-shaped narrow projection extending around the outer periphery of the sub-pixel may be formed as an alignment regulator. The narrow, elongated projections have the same effects and operations as the substantially conic projections 18. In addition, a slit-shaped opening (electrode slit) formed by cutting out a portion of a liquid-crystal driving electrode (the pixel electrode 9 or the counter electrode 31) may be used as the alignment regulator. The electrode silt is different from the projection in principle, but has the same effects and operations as the projection. In addition, the alignment regulator may be composed of a combination of the electrode slit and the projection. The alignment regulator is not necessarily formed on the same substrate as the color filter 22. That is, the alignment regulator and the color filter 22 may be formed on different substrates.

Moreover, in the above-described embodiments, the insulating film 40 for adjusting the thickness of the liquid crystal layer is formed only in the reflective display region R, but may be formed in the transmissive display region T as well as in the reflective display region R. In this case, the thicknesses of the insulating films in the respective display regions are adjusted such that the thickness of the liquid crystal layer in the reflective display region R is smaller than that in the transmissive display region T. For example, the thickness of the insulating film in the reflective display region R is adjusted larger than that in the transmissive display region T. In addition, the insulating film 40 may be formed not only on one substrate, but also on both substrates.

Further, in the above-described embodiments, TFTs, which are three-terminal elements, are used as pixel driving elements. However, TFDs (thin film diodes), which are two-terminal elements, may be used instated of the TFTs. In addition, the invention can be applied to a passive matrix liquid crystal display device not having these driving elements (for example, an STN-type liquid crystal display device).

The present application claims priority to Japanese Patent Application No. 2004-256809 filed Sep. 3, 2004, which is expressly incorporated by reference in its entirety.

What is claimed is:

1. A liquid crystal display device comprising:
a pair of substrates;
a liquid crystal layer interposed between the pair of substrates, the liquid crystal layer including a liquid crystal having a negative dielectric anisotropy;
a plurality of dot regions each having a transmissive display region, and a reflective display region;
a liquid-crystal-layer-thickness adjusting layer provided between the liquid crystal layer and at least one of the pair of substrates to provide the liquid crystal layer with a smaller thickness in the reflective display regions than in the transmissive display regions; and
a color filter layer provided between the liquid crystal layer and at least one of the pair of substrates, the color filter layer including a plurality of colored layers having different colors, each of which correspond to a respective one of the dot regions;
wherein colored regions in which the colored layers are formed and non-colored regions in which no-colored layers are formed are provided in the reflective display regions; and
a plurality of dielectric projections are provided in the plurality of dot regions to regulate an alignment of the liquid crystal in the transmissive display regions and reflective display regions, one of the dielectric projections being arranged entirely inside one of the non-colored regions in plan view, and a gap is provided between a top of the at least one dielectric projection and the substrate which is opposed to the top of the at least one dielectric projection among the pair of substrates.

2. The liquid crystal display device according to claim 1, wherein another of the dielectric projections is arranged such that the colored region in the reflective region of another of the dot regions overlaps thereto in plan view.

3. The liquid crystal display device according to claim 1, wherein an area ratio of the colored region to the non-colored region of one of the plurality of dot regions is not equal to that of another of the dot regions.

4. The liquid crystal display device according to claim 1, wherein an area ratio of the reflective display region to the transmissive display region of one of the plurality of dot regions is not equal to that of another of the dot regions.

5. An electronic apparatus comprising the liquid crystal display device according to claim 1.

6. A liquid crystal display device comprising:
a pair of substrates;
a liquid crystal layer interposed between the pair of substrates, the liquid crystal layer including a liquid crystal having a negative dielectric anisotropy;
a dot region including a transmissive display region and a reflective display region;
a colored layer provided in the dot region, and including a colored region in which the colored layer is formed and a non-colored region in which the colored layer is removed therefrom;
a concave portion formed by the colored region and the non-colored region; and
a dielectric projection provided in each of the transmissive display region and the reflective display region of the dot region to regulate an alignment of the liquid crystal in the dot region,
wherein one of the dielectric projections is arranged entirely inside of the concave portion in plan view, and a gap is provided between a top of the dielectric projection and the substrate which is opposed to the top of the dielectric projection among the pair of substrates.

7. The liquid crystal display device according to claim 1, further comprising an electrode for driving the liquid crystal, wherein the dielectric projection is formed on the electrode.

8. A liquid crystal display device comprising:
a pair of substrates;
a liquid crystal layer interposed between the pair of substrates, the liquid crystal layer including a liquid crystal having a negative dielectric anisotropy;
a plurality of dot regions each having a transmissive display region, and a reflective display region;
a liquid-crystal-layer-thickness adjusting layer provided between the liquid crystal layer and at least one of the pair of substrates to provide the liquid crystal layer with a smaller thickness in the reflective display regions than in the transmissive display regions; and
a colored filter layer provided between the liquid crystal layer and at least one of the pair substrates, the color filter layer including a plurality of colored layers having different colors, each of which correspond to respective a dot region;
wherein colored regions in which the colored layers are formed and non-colored regions in which no-colored layers are formed are provided in the reflective display regions;
the liquid-crystal-layer-thickness adjusting layer has a concave portion formed by the colored region and the non-colored region, the concave portion placed in the reflective display regions; and
a plurality of dielectric projections are provided in each of the transmissive display regions and reflective display regions of the plurality of dot regions to regulate an alignment of the liquid crystal in the transmissive display and reflective display regions, one of the dielectric projections being arranged inside of one of the non-colored regions and being arranged entirely inside of the concave portion in plan view, and a gap is provided between a top of each of the dielectric projections and the substrate which is opposed to the top of the dielectric projections among the pair of substrates.

9. The liquid crystal display device according to claim 6, wherein the dielectric projection is arranged entirely inside of the concave portion in plan view.

10. The liquid crystal display device according to claim 8, wherein the dielectric projection is arranged entirely inside of the concave portion in plan view.

11. The liquid crystal display device according to claim 1, wherein the dielectric projection is provided between the liquid crystal layer and the liquid-crystal-layer-thickness adjusting layer.

12. The liquid crystal display device according to claim 6, wherein the dielectric projection is provided between the liquid crystal layer and the colored layer.

13. The liquid crystal display device according to claim 8, wherein the dielectric projection is provided between the liquid crystal layer and the liquid-crystal-layer-thickness adjusting layer.

* * * * *